(12) United States Patent
Tian et al.

(10) Patent No.: US 8,401,975 B1
(45) Date of Patent: Mar. 19, 2013

(54) SYSTEM AND METHOD FOR PACKAGE PERFORMANCE ANALYSIS

(75) Inventors: Hong Tian, Seattle, WA (US); Devesh Mishra, Issaquah, WA (US); Mackenzie Smith, Issaquah, WA (US); James E. Bacus, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1023 days.

(21) Appl. No.: 11/744,336

(22) Filed: May 4, 2007

(51) Int. Cl.
*G06Q 99/00* (2006.01)

(52) U.S. Cl. ........ 705/335; 705/330; 705/331; 705/332; 705/333; 705/334

(58) Field of Classification Search .................. 705/400, 705/415, 1, 500
See application file for complete search history.

(56) References Cited

U.S. PATENT DOCUMENTS

| | | | |
|---|---|---|---|
| 5,222,018 A * | 6/1993 | Sharpe et al. .................... | 705/30 |
| 6,615,104 B2 | 9/2003 | England et al. | |
| 6,721,762 B1 | 4/2004 | Levine et al. | |
| 2002/0019759 A1 * | 2/2002 | Arunapuram et al. ............ | 705/7 |
| 2003/0050810 A1 | 3/2003 | Larkin | |
| 2003/0200111 A1 * | 10/2003 | Damji ............................... | 705/1 |
| 2005/0027660 A1 * | 2/2005 | Leroux et al. .................. | 705/400 |
| 2008/0126218 A1 * | 5/2008 | Alvarado et al. ............... | 705/26 |

OTHER PUBLICATIONS

U.S. Appl. No. 11/506,721, filed Aug. 18, 2006.

* cited by examiner

*Primary Examiner* — Akiba Allen
(74) *Attorney, Agent, or Firm* — Robert C. Kowert; Meyertons, Hood, Kivlin, Kowert & Goetzel, P.C.

(57) ABSTRACT

A computer-implemented method for analyzing package performance in a materials handling facility may include calculating an expected shipping cost for an item package and an actual shipping cost for the item package to determine excess shipping costs due to shipping item packages in the wrong container. The expected shipping cost may be the sum of the transportation cost and shipping materials cost when the item package is shipped in a recommended container. The actual shipping cost may be the sum of the transportation cost and shipping materials cost when the item is shipped in another container. The shipping materials costs may include the costs of the containers themselves and any non-item contents in the containers. A package performance analyzer may be configured to calculate excess shipping costs, generate various package performance reports according to received report parameters, and recommend corrective actions, including changing the available container types or providing training.

45 Claims, 12 Drawing Sheets

SYSTEM AND METHOD FOR PACKAGE PERFORMANCE ANALYSIS

BACKGROUND OF THE INVENTION

1. Field of the Invention

This invention relates to materials handling systems and more specifically to detection and correction of excess packaging costs.

2. Description of the Related Art

Many companies package groups of items together for a variety of purposes, such as e-commerce and mail-order companies that package items (e.g., books, CDs, apparel, food, etc.) to be shipped to fulfill orders from customers. Retailers, wholesalers, and other product distributors (which may collectively be referred to as distributors) typically maintain an inventory of various items that may be ordered by clients or customers. This inventory may be maintained and processed at a materials handling facility which may include, but is not limited to, one or more of: warehouses, distribution centers, cross-docking facilities, order fulfillment facilities, packaging facilities, shipping facilities, or other facilities or combinations of facilities for performing one or more functions of material (inventory) handling. Selecting inappropriate containers in which to package items may increase costs, in terms of container costs, shipping costs, and/or item damage.

A common concern with such groups of items, referred to herein as "item packages," involves ensuring that appropriate containers are used for shipping them, both to minimize costs and to protect the item contents. An agent may select a container based on a visual assessment of the items once they are grouped. Using this method, the agent may not be able to select an appropriate container until all of the items in the group have been collected. This visual method of selecting containers may be prone to human error, as an agent may select a container that is too small or that is larger than it needs to be to handle the items. This may result in higher costs associated with using an inappropriate container or in additional costs associated with re-work, in the case that an agent must re-package the items. For example, shipping a group of items in a box that is larger than necessary may result in a higher shipping cost than shipping the same items in a smaller box, due to the cost of the box and/or any higher fees associated with shipping larger or heavier boxes. Similarly, shipping items in a box that is larger than necessary, or not filling each box to capacity, may waste valuable (and expensive) transportation space (e.g., space in a truck or in a shipping container that will be placed on a train or an airplane). In another example, attempting to pack an item in a box that is too large or too small for the item may damage the item and/or may result in re-work if the item (or a group of items that include the item) must be taken out of one box and re-packaged in another (larger) box. These excess costs associated with shipping item packages in inappropriate containers may significantly reduce profit margins in some materials handling facilities.

SUMMARY

Various embodiments of a system and method for package performance analysis are disclosed. In some embodiments, a package performance analyzer may be configured to receive an indication of a container recommended to collectively handle an item package for shipping and to calculate the expected cost of shipping the item package in the recommended container. The recommendation of a container for shipping the item package may be dependent on stored dimension values for each of the items included in the item package, in some embodiments. The expected shipping cost may include both an expected transportation cost and an expected shipping materials cost. The transportation cost may be determined by a transportation method selector dependent on factors such as the size of the recommended container, the weight of the packed container, a requested delivery date, and/or the destination, in various embodiments. The expected shipping materials cost may include both the cost of the recommended container itself and any non-item contents expected to be included in the recommended container when shipped.

The package performance analyzer may also be configured to receive an indication of the actual container in which the item package was shipped and to calculate the actual cost of shipping the item package in that container. In some embodiments, the actual shipping cost may include an actual transportation cost and an actual shipping materials cost. Again, the transportation cost may be determined by a transportation method selector dependent on factors such as the size of the actual container, the weight of the packed container, a requested delivery date, and/or the destination, in various embodiments. The actual shipping materials cost may include both the cost of the actual container itself and any non-item contents included in the actual container when shipped. The costs of various containers and non-item contents may in some embodiments be stored in a memory and may be accessible by the package performance analyzer.

The package performance analyzer may be configured to store the expected shipping cost and the actual shipping cost in the memory and to associate them with an identifier of the item package, in some embodiments. The package performance analyzer may also be configured to compare the expected shipping cost to the actual shipping cost; and in response to determining that the actual shipping cost exceeds the expected shipping cost, to determine an excess shipping cost value for the item package and to store it in the memory.

In some embodiments, the actual shipping cost may be compared to an ideal shipping cost, i.e., the shipping cost that would be expected if the item package were shipped in an ideally-sized box (e.g., one that is just big enough to contain the items and to any required filler.) A second excess shipping cost value may be associated with an identifier of the item package to reflect a difference between the actual shipping cost and this ideal shipping cost, in some embodiments.

The package performance analyzer may be configured to perform its analysis for any number of item packages shipped by the materials handling facility, including all of them, in different embodiments.

In some embodiments, the package performance analyzer may be configured to provide a recommended corrective action for the excess shipping cost values it detects. The recommended corrective action may be dependent on feedback indicating one or more reasons that a recommended container was not used, such as because it was too large, too small, or not available. The corrective action may include one or more of: adding one or more additional container types in the materials handling facility, removing one or more container types from the materials handling facility, providing training for one or more agents in the materials handling facility, or directing given item packages to particular process lines in the materials handling facility.

The package performance analyzer may be configured to receive an indication of an identifier of an agent or a packing station in the materials handling facility responsible for packaging the item package and to associate the identifier with the item package. The package performance analyzer may also be configured to determine if a mismatch between a recommended container and an actual container was due to incorrect item dimensions being stored for one or more items in the item package. In such embodiments, the package performance analyzer may be configured to determine an excess shipping cost resulting from the use of the incorrect dimensions in recommending a container.

The package performance analyzer may be configured to generate various package performance reports automatically (such as on a pre-determined schedule) or in response to a request for one or more reports, in different embodiments. These reports may be generated by the package performance analyzer using various packaging-related information stored in memory. The reports may include information indicating one or more of: a summary of actual container usage, actual containers used for one or more item packages, containers recommended for one or more item packages, ideal containers for one or more item packages, expected shipping costs for one or more item packages, actual shipping costs for one or more item packages, ideal shipping costs for one or more item packages, container recommendations for the materials handling facility, excess shipping costs for one or more item packages, or one or more reasons that a recommended container was not used for one or more item packages. In some embodiments, the reports generated by the package performance analyzer may include information specified in one or more report parameters received with the report request. These report parameters may in some embodiments specify a time, a date, a time range, a date range, a location, a site, a facility, a process line, a packing station, an identifier of an agent, an identifier of an item package, a cost range, or an excess cost threshold, for example. In other embodiments, the report parameters may specify a format for the report.

The package performance analyzer described herein may be implemented in one or more software modules executing on one or more nodes of a computing system (e.g., as program instructions and data structures configured to implement functionality described), or in any combination of hardware and software components suitable for implementing the functionality described. For example, the package performance analyzer may in some embodiments be implemented as program instructions encoded on a computer-readable storage medium for execution by a computing system.

Figure 1:
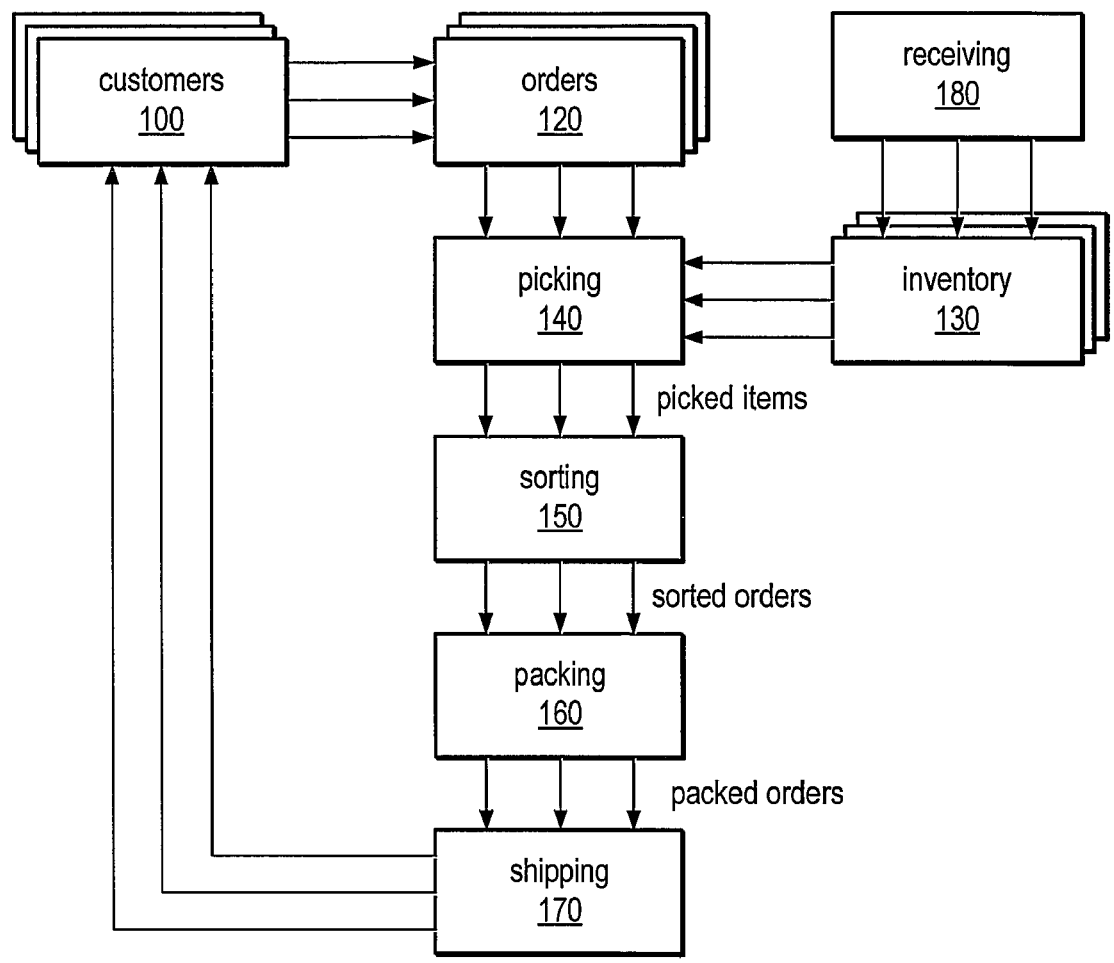
FIG. 1 illustrates a broad view of the operation of a materials handling facility, in one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

A packaging information service may include various components used to facilitate efficient and/or cost-effective operations in a materials handling facility. For example, in some embodiments, a product dimension correction system may be configured to facilitate stowing, picking, and packing operations. A package performance analyzer may be configured to work together with such a product dimension correction system to facilitate packing and shipping operations or may be configured to work independent of a product dimension correction system, in different embodiments. A product dimension correction system and a package performance analyzer are described in detail herein.

Product Dimension Correction System

Various systems and methods for correcting item dimension values for one or more items in a materials handling facility are disclosed. In some embodiments, such a method may be used to optimize selection of an appropriate container in which to store, convey, or ship an item or group of items from among available containers of different sizes, shapes, and/or materials. The system may operate in environments in which the items that are available frequently change and/or in which available items themselves can change, with the system automatically adapting to such changes, in various embodiments. For example, item dimension values for a given item may need to be corrected if item dimension values received from a vendor of the item were inaccurate, or if an item changes subsequent to its dimension values being stored within the system (e.g., its packaging may have changed or the item itself may have changed shapes or sizes).

In particular, in some embodiments, a computer-implemented method may automatically determine that item dimension values for one or more items are not accurate and may correct them, or facilitate their correction. Correcting inaccurate item dimension values using such a method may, in some embodiments, facilitate efficiency and cost-effectiveness in various operations of a materials handling facility.

As used herein, "item packages" may refer to items grouped for shipping to a customer or items grouped for any other operation within a materials handling facility, such as for storing in inventory or transporting to a packing or shipping station. In various embodiments, "containers" may include pallets, crates, cases, bins, boxes, carts, totes, conveyor belts, shelves, cabinets, or any other apparatus capable of storing, conveying or shipping one or more items.

In some embodiments, the system may be configured to recommend various containers suitable for shipping one or more items or for storing or conveying one or more items in the materials handling facility, dependent on item dimension values currently associated with the items. For example, the system may recommend a particular box type and/or size suitable for shipping a group of items associated with a customer order based on the item dimension values provided by the vendor of each of the items in the group and the dimensions of the boxes available for shipping.

In some embodiments, an automated product dimension correction system may be used to identify incongruous item packages whose dimensions do not correspond to the currently associated item dimension values for the items in the package. For example, if a group of items fits in a container significantly smaller than a container recommended by the system, this may indicate that currently stored item dimension values of one or more items included in the container are not accurate. In such cases, the product dimension correction system may recommend that one or more of the items be measured, or may initiate a measurement of one or more of the items. The results of the measurement(s) may then be automatically incorporated by the system in an appropriate manner, such as by updating item dimension values to reflect one or more actual dimension values from the measurement (e.g., by replacing an initial item dimension value with a measured item dimension value, by adjusting a range of allowable values for an item dimension, by adjusting the confidence level or uncertainty level associated with an item dimension value, etc.).

The product dimension correction system may be used to detect that the item dimensions supplied by a vendor are inaccurate or that the size or shape of an item has changed, in some embodiments. For example, if one or more items fit best in a container different than a recommended container, this may indicate that the stored dimension values of the item are inaccurate. In some cases, this may indicate that the initial value for one or more item dimensions of one or more of the items, such as a value supplied by a vendor, was significantly different than the actual dimension value of the item. In still other cases, this may indicate that the actual dimensions of one or more of the items has changed, such as if one of the items has been packaged differently by the vendor or the dimensions of the item itself have changed. In some embodiments, measurements of one or more items of these item packages may be performed to determine the cause of each identified incongruity. In other embodiments, the product dimension correction system may continue to gather information about the items in the item package in order to determine if there is an inaccuracy in one or more item dimension values and if this inaccuracy is due to a change or a poor input, or if it is a statistical outlier (e.g., a single instance of a defective item or item identifier.)

In one example, a product dimension correction system may be used as part of a distribution operation for an organization that ships large numbers of item packages to customers. In this example, the organization may maintain information about each of the items that is available to be shipped, but that item information may not include precise and accurate dimension values for all of the items. When the system has sufficient dimension information for the items intended to be the contents of an item package (e.g., if any item dimension information is currently associated with the items in the item package), the system may then anticipate the total dimensions of the item package based on those item dimensions and on the dimensions of any non-item contents of the package (e.g., air bags or foam used as padding or filler, promotional inserts from the organization, etc).

In some embodiments, the item dimension values may be used to identify containers whose volume and/or dimensions are appropriate for handling one or more items (e.g., to identify containers for storing, conveying or shipping groups of items, or to determine if an item or group of items can pass through a particular portal or be conveyed using a particular dimensionally-constrained path.) In addition, in some embodiments the dimension values and/or volume of the packaging materials and any other non-item contents may also be considered when recommending a container for the item package. For example, the container dimension values and dimension values for promotional inserts and/or fill materials may be supplied to the facility as an input and may be used in determining an appropriate container and/or in detecting any incongruities in container selection and use.

In one embodiment, the volume of an item may be defined to be equal to the volume of a three-dimensional bounding box having length, width, and height equal to the length, width, and height of the item, and the volume of a container may be defined to be the maximum volume of the interior of the container. In some embodiments, the volume and dimensions of a group of items may be defined, respectively, to be the volume and corresponding dimensions of a three-dimensional bounding box having sufficient length, width, and height to contain all of the items in the group at the same time. For example, in one embodiment, a container recommendation may be determined using a particular packing algorithm that calculates the volume of such a bounding box according to guidelines and conventions for packing one or more items (e.g., the packing algorithm may specify that the largest and/or heaviest item should be placed horizontally on bottom of the container first and additional items may be placed on top of, or next to, this item in order of their largest dimension value, their weight, etc.) In another embodiment, the system may be configured to calculate a volumetric utilization (e.g., the percentage of the container that would be filled by the items and any non-item contents) for the items when placed in containers of various sizes and shapes. The system may then recommend a container dependent on maximizing the volumetric utilization. While the examples contained herein use the definitions described above, other embodiments may use other definitions of volume and/or volumetric utilization, or may not use a determination of volume or volumetric utilization as part of product dimension correction.

In some embodiments, the product dimension correction system may consider additional factors when identifying inaccurate item dimension values. For example, values for dimensions may vary for at least some items and packaging materials based on factors such as current temperature, humidity, altitude, etc. In addition, when a particular item or type of packaging material may be supplied from multiple suppliers, the item dimension values for those items may be adjusted as appropriate based on the supplier if variations based on the supplier occur. More generally, a variety of techniques may be employed to track a variety of environmental and other relevant factors corresponding to items and packaging materials in order to determine which of the factors has a possible causal or correlative effect on the values of the item dimensions, and item dimension values for those items may then be adjusted to reflect those factors, such as automatically and in a real-time manner, according to various embodiments. For example, the system may consider a minimum, typical, or maximum allowed item dimension value of a given item when recommending a container for an item package, dependent on the environmental factors or vendor. The product dimension correction system may consider any values within this range of values for the particular item dimension to be "correct," in some embodiments, or may correct the allowed range of values if it is determined to be inaccurate and/or unsuitable for use in recommending containers for item packages that include the given item.

For illustrative purposes, some embodiments of product dimension correction are discussed below in which particular item and container parameters are analyzed in particular manners, and in which particular types of analyses and processing of parameters is performed. However, those skilled in the art will appreciate that the techniques described may be used in a wide variety of other situations, and that the invention is not limited to the details of these example embodiments.

An exemplary block diagram of a materials handling facility, which, in one embodiment, may be an order fulfillment facility configured to utilize product dimension correction as described herein, is illustrated in FIG. 1. In this example, multiple customers 100 may submit orders 120 to a distributor, where each order 120 specifies one or more items from inventory 130 to be shipped to the customer or to another entity specified in the order. An order fulfillment facility typically includes a receiving operation 180 for receiving shipments of stock from various vendors and storing the received stock in inventory 130. To fulfill the customer orders 120, the one or more items specified in each order may be retrieved or "picked" from inventory 130 (which may also be referred to as stock storage) in the order fulfillment facility, as indicated by block 140. Picked items may be delivered to one or more stations in the order fulfillment facility for sorting 150 into their respective orders, packing 160, and finally shipping 170 to the customers 100. Note that not every fulfillment facility may include both sorting and packing stations. In certain embodiments agents may transfer picked items directly to a packing station, such as packing station 160, while in other embodiments, agents may transfer picked items to a combination sorting and packing station (not illustrated). This may result in a stream and/or batches of picked items for multiple incomplete or complete orders being delivered to sorting 150 for sorting into their respective orders for packing 160 and shipping 170, according to one embodiment.

Note that portions of an order may be received at different times, so sorting 150 and packing 160 may have to wait for one or more items for some orders to be delivered to the sorting station(s) before completion of processing of the orders. Note that a picked, packed and shipped order does not necessarily include all of the items ordered by the customer; a shipped order may include only a subset of the ordered items available to ship at one time from one inventory-storing location. Also note that the various operations of an order fulfillment facility may be located in one building or facility, or alternatively may be spread or subdivided across two or more buildings or facilities. In various embodiments, items and groups of items may be transported between the stations or operations of the facility in one or more containers, through one or more portals, and/or using one or more dimensionally-constrained paths, as described herein.

Product dimension correction, as described herein in various embodiments, may be utilized in several areas of a materials handling or order fulfillment facility such as during storing in inventory 130, picking 140, sorting 150, packing 160, or shipping 170. For example, if an agent is directed to store an item in a shelf, bin, crate, box, or other container in inventory 130, but it does not fit, the product dimension correction system may detect that one or more item dimension values associated with the item are inaccurate and may initiate correction (e.g., by directing that the item should be measured). Similarly if an agent is directed to transport one or more items within the facility during picking 140, such as in a tote, but the items do not all fit in the tote, the product dimension correction system may detect that one or more item dimension values associated with one or more of the items are inaccurate and may initiate correction. In yet another example, if an item is to be transported through a portal or chute and the item does not fit through the portal or chute, the product dimension correction system may detect that currently stored item dimension values are inaccurate and/or may correct one or more dimension values for the item. The product dimension correction system may use container dimension values of any actual containers, portals, or paths with which the item is handled during storing 130, picking 140, sorting 150, packing 160, or shipping 170 to detect inaccurate item dimension values and/or to correct them, in various embodiments.

In some embodiments, information about the actual containers, portals, or paths used in handling one or more items during the operations described above may be automatically captured as a by-product of normal operation. For example, product dimension correction system may receive or capture an identifier of such a container when an agent places an item in the container, according to various embodiments. Similarly, a product dimension correction system may automatically receive or capture an identifier of an item when it is placed in a container, passed through a portal, or put on a dimensionally-constrained path, in some embodiments. For example, a bar code or Radio Frequency Identification tag (RFID tag) of a container and/or an item may be automatically scanned and the data from the scanner may be automatically stored in one or more tables, databases, or other data structures accessible by the product dimension correction system when the item is placed in the container. In another example, an item may be scanned when it passes through a portal, such as a doorway between two rooms or buildings, or when it is placed in a chute. In some embodiments, items and corresponding containers, portals, or paths may be scanned as part of normal operations when items are stored, picked, transported, or sorted, or when they are placed in a container for shipping. Therefore, in some embodiments, no additional steps may need to be performed to capture identifiers of the items and the containers, portals, or paths used in handling them in the facility. In some embodiments, these identifiers may be associated with one or more entries in tables, databases, or other data structures containing item dimension values currently associated with various containers, portals, paths, and items.

A system configured to implement product dimension correction may, in some embodiments, also be configured to instruct or recommend the selection, from among available containers, of a container in which to place one or more items, or a portal or path through which to convey the items, during the receiving 180, storing in inventory 130, picking 140, sorting 150, packing 160, or shipping 170 operations described above. In some embodiments, the selection of containers that are neither too small nor larger than they need to be may result in more efficient use of space in the facility for storage and other operations, and may also reduce costs associated with floor space, packing materials, or transportation (e.g., shipping). In some embodiments, the product dimension correction system may be used to estimate corresponding dimensions of a container suitable for storing, transporting, or shipping the items that is space-efficient and/or cost effective. In some embodiments, the product dimension correction system may be used to determine if an item or group of items will fit in a given inventory area, will fit through a given portal, such as a doorway, hatch, or gate, or can be transported using a given dimensionally-constrained path, such as a chute, track, pipe, or conveyor belt. In other embodiments, a product dimension correction system may be used to facilitate item picking, such as by directing an agent to select a given item from a particular inventory area based on the relative values of actual (e.g., corrected) dimension values of the items in the inventory area.

Automated product dimension correction, as described herein in various embodiments, may be utilized in a number of different facilities and situations, including, but not limited to materials handling facilities, order fulfillment centers, rental centers, distribution centers, packaging facilities, shipping facilities, libraries, museums, warehouse storage facilities, and the like. Note that the arrangement and order of operations illustrated by FIG. 1 is merely one example of many possible embodiments of the operation of an order fulfillment facility utilizing automated product dimension correction. Other types of materials handling, manufacturing, or order fulfillment facilities may include different, fewer, or additional operations and resources, according to different embodiments.

In some embodiments, a materials handling facility may store different instances of items in different individual inventory areas within inventory 130. Additionally, different items may be stored together in a single inventory area, according to particular embodiments. In some cases, storing different items together may result in more efficient use of total inventory space than using a single inventory area for multiple copies of a single item or product. In other cases it may be beneficial to store similar items together to make better use of inventory space. In some embodiments, such as that illustrated in FIG. 2, an inventory area may include both similar items stored together, such as on one shelf, and different items stored together, such as on another shelf. In this example, storing different compact discs (CDs) together on a single inventory shelf, as shown in inventory area 235b, may use the available inventory space more efficiently than storing one CD among other items of greatly differing size and shape, such electronic devices, clothing, or other items. In some embodiments, a materials handling facility may also store items of similar, but not identical, shape and size together in a single inventory area. For instance, in one embodiment, items such as books, CDs, and digital video discs (DVDs) may all be stored together, as shown in inventory area 235a. In still other embodiments, different items, with different shapes and sizes, may all be stored together. For example, inventory area 235e illustrates clothing and electronic items stored along with books, CDs, etc.

In some embodiments, determining where to store an item may be performed manually, while in other embodiments, it may be an automatic process performed by one or more computer software programs based on the dimensions of the items. In some embodiments, both space utilization and speed of storing may be improved if an agent is directed to store an item in an inventory area, such as a shelf or bin, in which it will easily fit. In some such embodiments, selecting an appropriate inventory area may also reduce damage during the storing operation if items are not forced into shelves or bins that are too small. In some such embodiments, the product dimension correction system may consider the dimensions of an item that needs to be stored, the dimensions of currently stored items, and the dimensions of inventory areas in which items are currently stored when identifying an inventory area with enough remaining free space to hold the item. For example, if a book is to be stored in one of the inventory areas illustrated in FIG. 2, the product dimension correction system may use the dimensions of the book to determine that it is too wide to fit in any remaining spaces of inventory areas 235a, 235b, 235c and 235e, based on the dimensions of the other items stored in those areas. In this example, the product dimension correction system may determine that the book should easily fit in inventory area 235d and may direct an agent to store it in this area. In some embodiments, if the item does not fit in the area recommended by the product dimension correction system, the product dimension correction system may be configured to correct one or more item dimension values currently associated with the item, such as values maintained in a table, database, or other data structure comprising item parameters.

Similarly, for operations other than storing, selecting an appropriate container in which to place one or more items may also increase space utilization and/or reduce damage and costs. For example, selecting an appropriate portal or dimensionally-constrained path through which to convey an item may reduce damage caused by trying to fit an item through a portal that is too small or by trying to place an item in a chute that is too narrow for the item. In another example, being able to accurately determine the size of totes needed for picking groups of items and being able to pack these totes to near capacity, based on having accurate dimension values for the items in the group, may reduce the number of such totes needed, thereby reducing costs.

Figure 2:
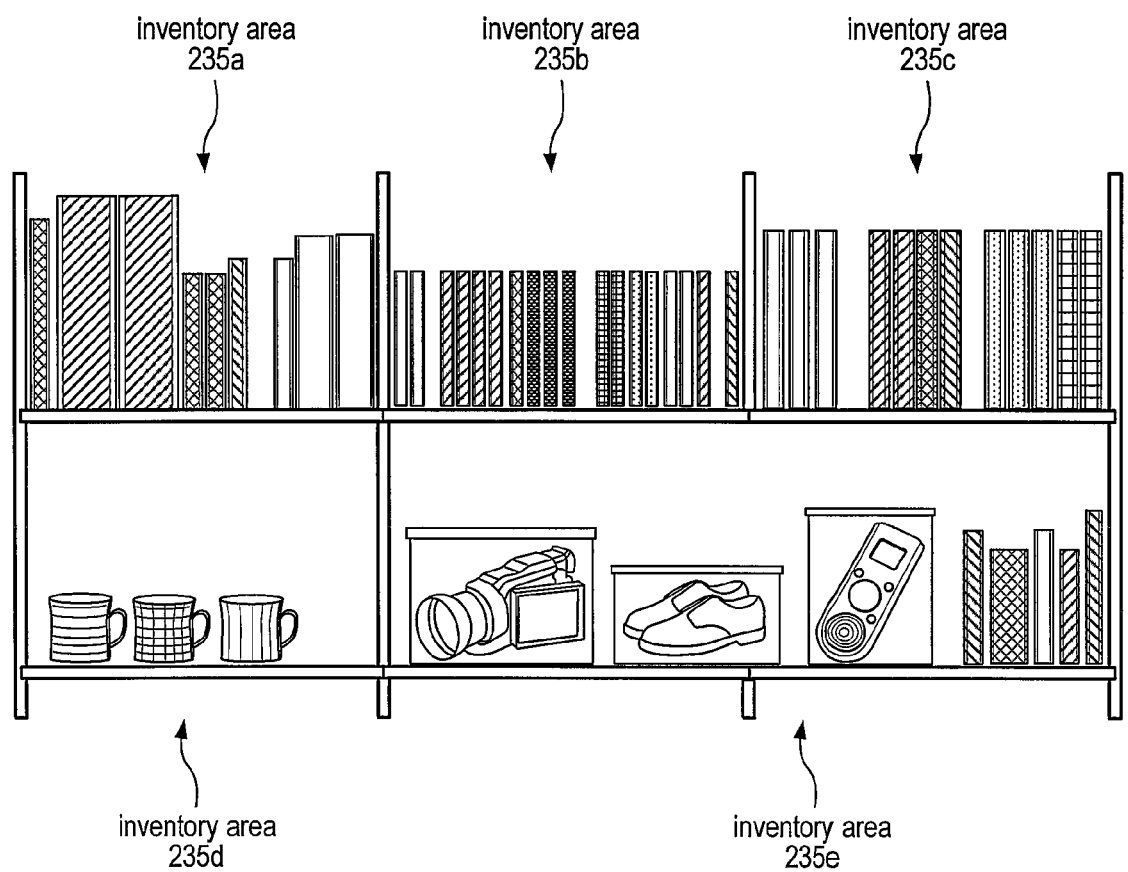
FIG. 2 illustrates various items stored in a multi-shelf inventory area, according to one embodiment.

The items in a materials handling facility may be of varying shapes and sizes, as shown in the exemplary inventory areas illustrated in FIG. 2. In this example, some items in the materials handling facility are irregularly shaped. In some embodiments, irregularly shaped items may be stored in boxes or other regularly shaped packaging, which may facilitate container recommendation, product dimension correction, and/or more efficient storage, such as by making stacking of such items possible. This is illustrated in inventory area 235e. In other embodiments, irregularly shaped items may be stored without placing them in regularly shaped packaging. This is illustrated in inventory area 235d. According to various embodiments, automated product dimension correction may be utilized with any regularly shaped or irregularly shaped items.

As previously noted, product dimensions may be used to facilitate item identification for picking, in some embodiments. In such embodiments, the system may be configured to determine, and/or communicate to an agent, a size, shape, or relative size or shape of an item to be picked. For example, in one embodiment, an agent may be directed to select an item from a particular inventory area that is approximately 10 inches tall or 3 inches wide, based on the currently stored values for the height or width of the item. In another embodiment, an agent may be directed to select the "shortest" item or the "thinnest" item in a particular inventory area, based on the relative values of the currently associated dimension values for each of the items in the area. In an example illustrated by FIG. 2, an agent may be directed to select the tallest or widest item in inventory area 235a, either of which would clearly indicate one of two identical items in the area. In some embodiments, the relative shape or size of an item may be combined with other information when directing an agent to identify the item, such as the type or color of the item. For example, an agent may be directed to select the "widest book," the "tall, red book," or the "short, blue box" in inventory area 235*e*.

In embodiments in which size, shape or relative size and/or shape are used to facilitate the picking operation, the product dimension correction system may be used to detect and/or correct inaccurate item dimension values. For example, if an agent is directed to select the tallest item in a particular area, but the tallest item in the area is not the item that was to be picked, the agent may provide feedback to the product dimension correction system indicating that one or more currently stored item dimension values for the item, or for other items stored in the same area, may be inaccurate.

In some embodiments, the product dimension correction system may make particular assumptions about item dimensions or may assign item dimensions according to a standard algorithm, or company policy, in order to facilitate the recommendation of containers for item packages and/or product dimension correction. For example, in one embodiment, the item dimension having the largest value may be designated to be the "height," the dimension having the second largest value may be designated to be the "length," and the dimension having the smallest value may be designated to be the "width" of the item. In such embodiments, the dimensions of containers may also be designated using the same assumptions. In other embodiments, different assumptions or assignments may be made or the designation of length, height, and width dimensions of items or containers may be arbitrary. In some embodiments, standards or policies may specify other aspects of product dimension correction, such as a default placement or orientation for certain items within containers or a specific bin-packing algorithm to be assumed when recommending containers and/or detecting and correcting item dimension values. For example, a policy may specify that the largest item in a group should be placed horizontally along the bottom of shipping boxes.

Figure 3:
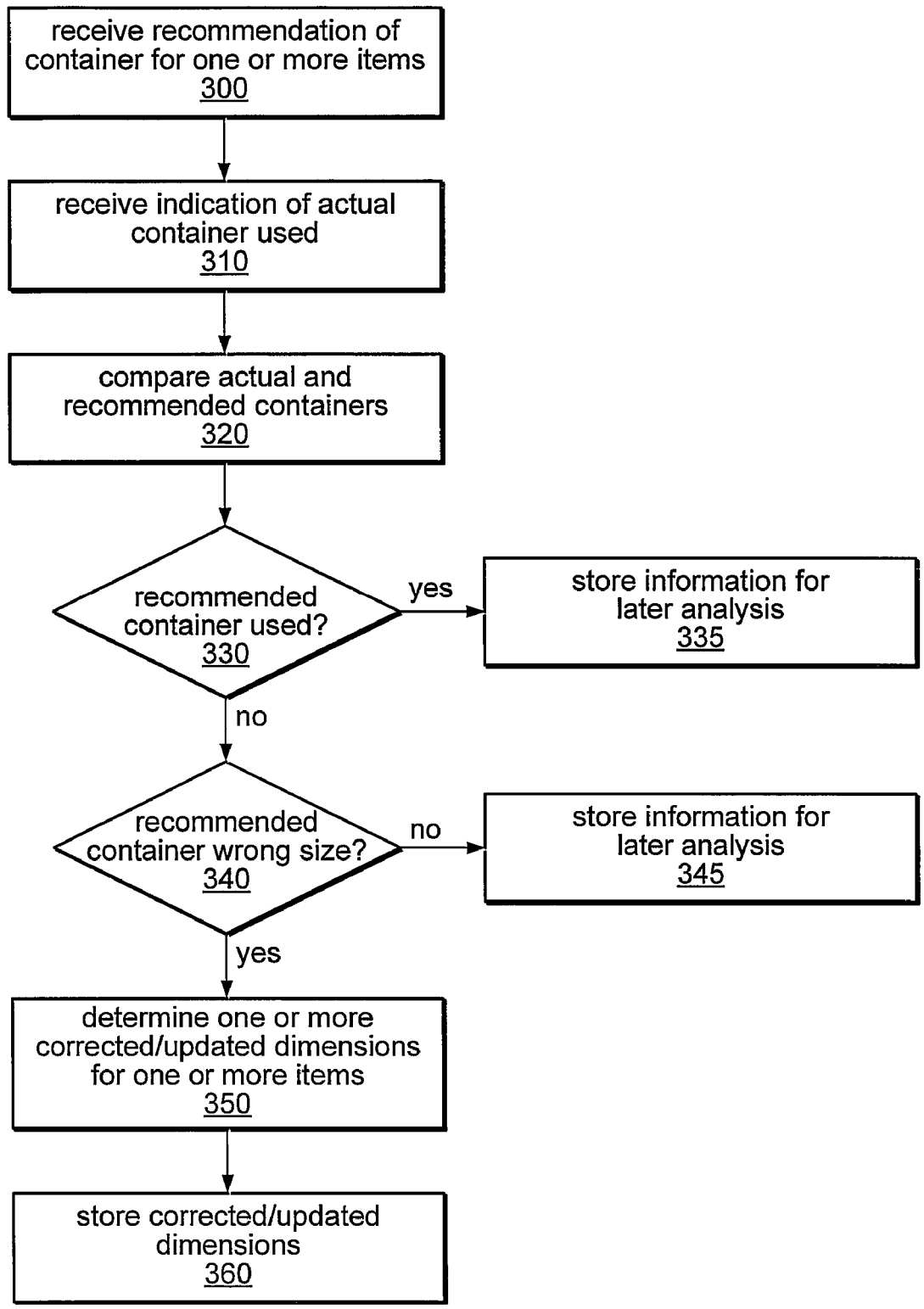
FIG. 3 illustrates a method for detecting and correcting inaccurate item dimensions, according to one embodiment.

One method for performing product dimension correction is illustrated by the flow chart in FIG. 3. In this example, the method may include receiving a recommendation for a container in which to handle an item package that includes one or more items, as in 300. The container may be recommended as a smallest container in which the item package (including the one or more items and/or any non-item contents) may be transported within a materials handling facility or in which the item package may be shipped. The recommendation may be generated by, or received by, a module of a product dimension correction system, as described herein, which may be implemented in any combination of hardware and software within the materials handling facility, in various embodiments. In other embodiments, the recommendation may be received from a remote system that is configured to exchange information with the operations of the materials handling facility. For example, a product dimension correction system may be implemented as a software application executing on a computing system in the materials handling facility and configured to implement recommending a container for an item package. It may be configured to receive inputs from other software applications, agents working in the facility or remotely, and/or automated systems within the facility (e.g., scanners, sensors, automated storing, picking, or packing equipment, or software applications managing one or more local or remote data stores.) In another example, the recommendation may be received from a separate mechanism, such as a container recommender implemented in a combination of hardware and software executing on the same or a different computing system within the materials handling facility or remotely.

An automated product dimension correction system may be configured to recommend a container, portal, or path for handling the item package based on the currently stored volume and/or dimensions of each of the items included in the item package. In some embodiments, the automated product dimension correction system may calculate the overall dimensions of the item package based on the item dimensions of each of the items as well as dimensions of any required non-item contents (if any). In such cases, the product dimension correction system may be configured to recommend a smallest available container in which the grouped items will fit, a portal through which they may pass, or a dimensionally-constrained path on which they may be conveyed based on the calculated overall dimensions. In other embodiments, the product dimension correction system may use a standard or custom bin-packing algorithm to determine, for each available container, whether or not the items will fit in the container. In some embodiments, the product dimension correction system may begin its recommendation process by determining if the items will fit in the smallest available container, or through the smallest portal or path, and if not, repeating its determination for each other container, portal, or path in turn, from smallest to largest, until determining that the items will fit into one of the containers or through one of the portals or paths. In other embodiments, the identification of suitable containers, portals, or paths for handling the package may be performed in other manners. For example, the product dimension correction system may track container, portal, or path types corresponding to those handling various groups of item contents, and may retrieve an indication of one or more appropriate container, portal, or path types for handling the current item contents based on a stored mapping for those contents.

Recommending a container, portal, or path may include displaying an indicator of the container, portal, or path to be used on an input/output device readable by an agent working in the materials handling facility, in some embodiments. In other embodiments, a recommendation for a container, portal, or path may be printed for an agent, such as on a pick list or packing list. In still other embodiments, a machine may be configured to pick and/or present a container (such as a box) to an agent or to an automated packing system based on the recommendation or to automatically transport the items to a portal, path, or packing station (e.g., one handling item packages having a particular range of items dimensions) for further handling. Therefore, receiving a recommendation for a container, as in 300, may include being presented with a printed or displayed recommendation, being presented with a recommended container, or receiving an indication that an item package has been routed to a particular portal, path, or packing station, in different embodiments.

As shown in the example illustrated in FIG. 3, the method may include receiving an indication of a container actually used to handle the item package, as in 310. In some embodiments, if a recommended container, portal, or path is inappropriately sized for handling an item package, an agent or automated mechanism may select a more suitable container, portal, or path for the items and feedback may be sent to the product dimension correction system indicating that a recommended container, portal, or path was not used. This indication may be received from an agent, in some embodiments, or from an automated feedback mechanism of various operations of the materials handling facility. For example, if items and containers are scanned when the items are placed in a container for storage, transport, or shipping (and the scanned information is input to the product dimension correction system), the product dimension correction system may receive an indication of the container in which the item package was actually handled. In some embodiments, a packing system may include a scanner or sensors and software to detect that one or more items are sticking out of a box, that a box will not close, or that a box is half-empty, and may be configured to select a different box for the item package. In other embodiments, an agent of the materials handling facility, such as a picking, sorting or packing agent, may detect that a recommended container is not appropriate for the group of items intended to be placed in it and may provide an indication to the product dimension correction system to that effect and/or that one or more of the item dimension values for those items may be inaccurate. For example, an agent working in the facility may visually detect that one or more items is not completely contained within a recommended box, bin, tote, or shelf, or that a recommended box, bin, tote, or shelf is not filled to near its capacity, and may select a different container for the item package. In yet another example, if an item or group of items is expected to be able to pass through a particular portal or fit through a particular chute based on currently stored item dimension values, but the item or items do not fit, an agent or an automated operation may provide feedback to the product dimension correction system indicating that the items do not fit and/or that one or more of the item-dimension values for those items may be inaccurate.

Figure 5:
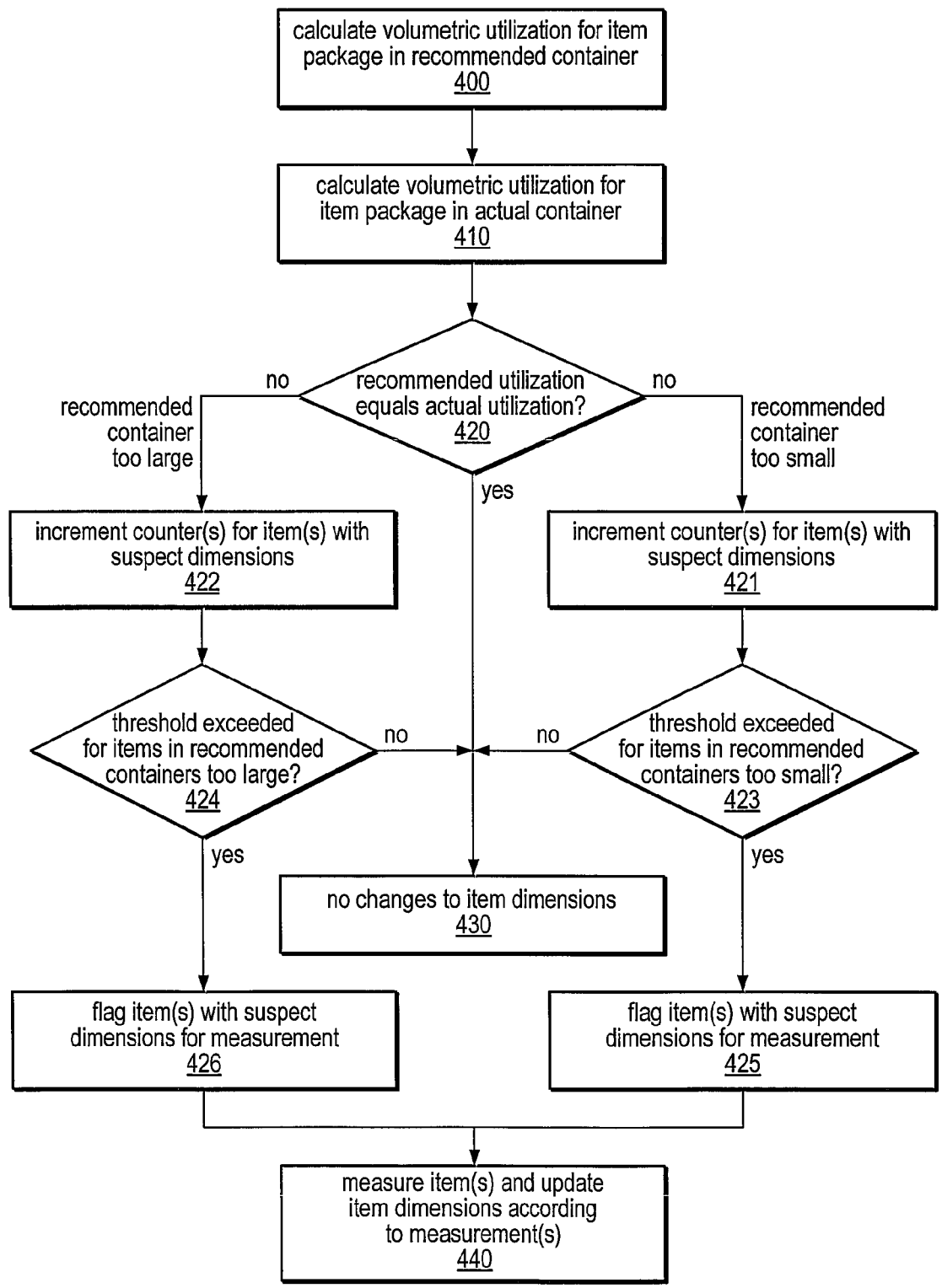
FIG. 5 illustrates a second embodiment of a method for determining and correcting inaccurate dimension information for an item.

As illustrated in FIG. 3, the method may include comparing the recommended container and the actual container used, as in 320. For example, in one embodiment, the product dimension correction system may compare an identifier of the actual container (e.g., one received as feedback from an agent or automated operation) with an identifier of the recommended container to see if they match. Using this comparison, the product dimension correction system may detect that a recommended container was not used and/or that the items were placed in a container smaller or larger than one recommended based on currently stored item dimension values for the items in the item package. Other methods of performing a comparison between an actual and a recommended container are illustrated in FIG. 5 and described below.

If the recommended container was used, shown as the positive exit from 330, the method may include storing an identifier of the recommended container and/or the actual container along with information about the item package for further analysis, as in 335. For example, a performance tracking operation of the materials handling facility may review the number of correctly recommended containers for different item packages and/or for item packages that include particular items in order to detect any issues with the container recommendation process.

If the recommended container was not used, shown as the negative exit from 330, the method may include determining if the recommended container was not appropriately sized, as in 340. For example, in some embodiments, an agent may provide feedback indicating one or more reasons why the recommended container, portal, or path was not used, such as that it was smaller or larger than necessary, or that the recommended container was available. The product dimension correction system may, in some embodiments, incorporate this additional information when updating a value or confidence level for one or more dimension values for one or more of the items in the container. If the recommended container was appropriately sized, shown as the negative exit from 340, the method may include storing an identifier of the recommended container and/or the actual container along with information about the item package for further analysis, as in 345. For example, a performance tracking operation of the materials handling facility may review the number of mismatches between recommended and actual containers for different item packages when the recommended container was appropriately sized to detect any issues with the operations of the materials handling facility (e.g., if not enough boxes of a given size are being supplied to the facility). A package performance analyzer may be configured to determine if an individual agent or packing line is responsible for an inordinate number of mismatches between recommended and actual containers and to take corrective action. Such a package performance analyzer is described in more detail below.

An agent may provide feedback to the product dimension correction system in a variety of ways including, but not limited to, by scanning a container used, entering container, portal, or path information through a terminal or other input/output device serving to input data to the product dimension correction system, or pressing one or more buttons, keys, levers, or touch pads to indicate whether or not the recommended container, portal, or path was used and/or the reason, if it was not. In some embodiments, an agent may provide feedback to the product dimension correction system indicating a particular item in an item package is not completely contained within the container, such as if a tall item sticks out of the top of a box or a wide item overhangs the edge of a bin. In such cases, the product dimension correction system may use this information to determine that stored item dimension values for the given item are inaccurate. In other embodiments, the product dimension correction system may determine that a recommended container was too small or larger than necessary by comparing container dimension values of the recommended container and the actual container. A more detailed description of a method for performing a comparison between an actual and a recommended container is illustrated in FIG. 5 and described below. In some embodiments, the feedback provided by an agent may be accessed by a package performance analyzer. In addition, information collected automatically by the system (e.g., information indicating the recommended and actual containers used, and an identifier of the agent and/or packing station responsible for packaging the items) may also be accessed by a package performance analyzer. A package performance analyzer may be a performance management tool applied to packaging-related and shipping-related operations. One such package performance analyzer is described in more detail below.

As illustrated in FIG. 3, the method may include determining that one or more item dimension values for one or more items in an item package are inaccurate and determining correct values for those dimensions, as in 350. For example, a product dimension correction system may determine that item dimension values are inaccurate based on feedback received from various agents of the facility or from automated feedback mechanisms, and/or based on an analysis of information collected for one or more incidences of a mismatch between a recommended container and an actual container. If one or more item dimension values are determined to be inaccurate, the method may include measuring one or more items in the item package to obtain accurate item dimension values and comparing these values to currently stored item dimension values. For example, a product dimension correction system may be configured to recommend measuring one or more items, to automatically cause the item(s) to be measured (e.g., by sending instructions to automated picking and/or dispatching equipment to transport the items to a measurement station), or to place one or more item identifiers on a list of items to be picked and measured by agents in the facility (e.g., a list of items to be measured overnight based on incongruities detected during the day). By measuring the items, either manually or using an automated method (such as a CubiScan™ machine), accurate item dimension values may be determined.

Finally, as illustrated in FIG. 3, the method may include updating any stored item dimension values with values obtained by measuring the item(s), as in 360. In some embodiments, updated item dimension values may be incorporated in a real-time or near real-time manner, such as to enable recommendations of containers, portals, or paths for groups of items containing overlapping contents to use updated dimension values and/or updated confidence levels. In some embodiments, if updated item dimension values are determined for a given item, the method may include automatically initiating a manual review (or an updated container recommendation) for any item packages that are currently in the facility that include the given item, may indicate that preparation of any item packages that are to include the given item should be postponed, may reduce any allowable variance with respect to the given item so as to maximize the likelihood of identifying other packages that include copies of the given item that have a problem, or may take other action to prevent problems concerning the storage, transport or shipping of groups of items containing the given item. In other embodiments, the method may include measuring items for which currently stored item dimension values are suspect at another time rather than during normal operations (e.g., once per day or once per shift) and updating any corrected item dimension values after one or more of the measurements have been performed (e.g., by re-loading one or more tables, databases, or other data structures with corrected item dimension values after all items scheduled to be measured at the end of the shift have been measured.)

In some embodiments, an external party (e.g., a supplier or manufacturer of an item) may provide item dimension value information for items that they supply. In some embodiments, such third-party information may be used as an initial default value for the item dimension values, and may be adjusted by the product dimension correction system if the values are determined to be inaccurate (e.g., if it is determined that they contribute to detected incongruities between recommended and actual containers of item packages that include the items.) In some embodiments, if the item dimension values associated with a given item are trusted to be accurate (e.g., if the item has been measured recently and the associated item dimension values were corrected or did not require correction), the product dimension correction system may consider this situation when determining which, if any, of the items in an item package should be measured if a mismatch occurs between a recommended container and an actual container. For example, in one embodiment, all item dimension values obtained by measuring an item within a given time period (e.g., within the last week or month) may be considered trusted, and the item may be given a lower priority for additional measurements when a container incongruity is detected. Similarly, if the item dimension values provided by a particular vendor have consistently been shown to be accurate (e.g., by measuring some or all of the items and comparing the measurements to the item dimension values provided), any item dimension values provided by the particular vendor may be considered trusted, and the corresponding items may be given a lower priority for additional measurements when a container incongruity is detected. In another example, some item dimension values are standard for a particular product type (e.g., the width of CDs, DVDs, or VHS products) and may be considered trusted dimensions.

As described above, an agent or automated operation of the materials handling facility may in some embodiments provide feedback to facilitate product dimension correction. For example, an agent or automated operation may provide inputs to a software application executing on a computing system in the facility (or remotely) that is configured to perform product dimension correction. The product dimension correction application may be configured to perform the functionality illustrated in FIG. 3, or similar functions suitable for performing product dimension correction as described herein.

Figure 4:
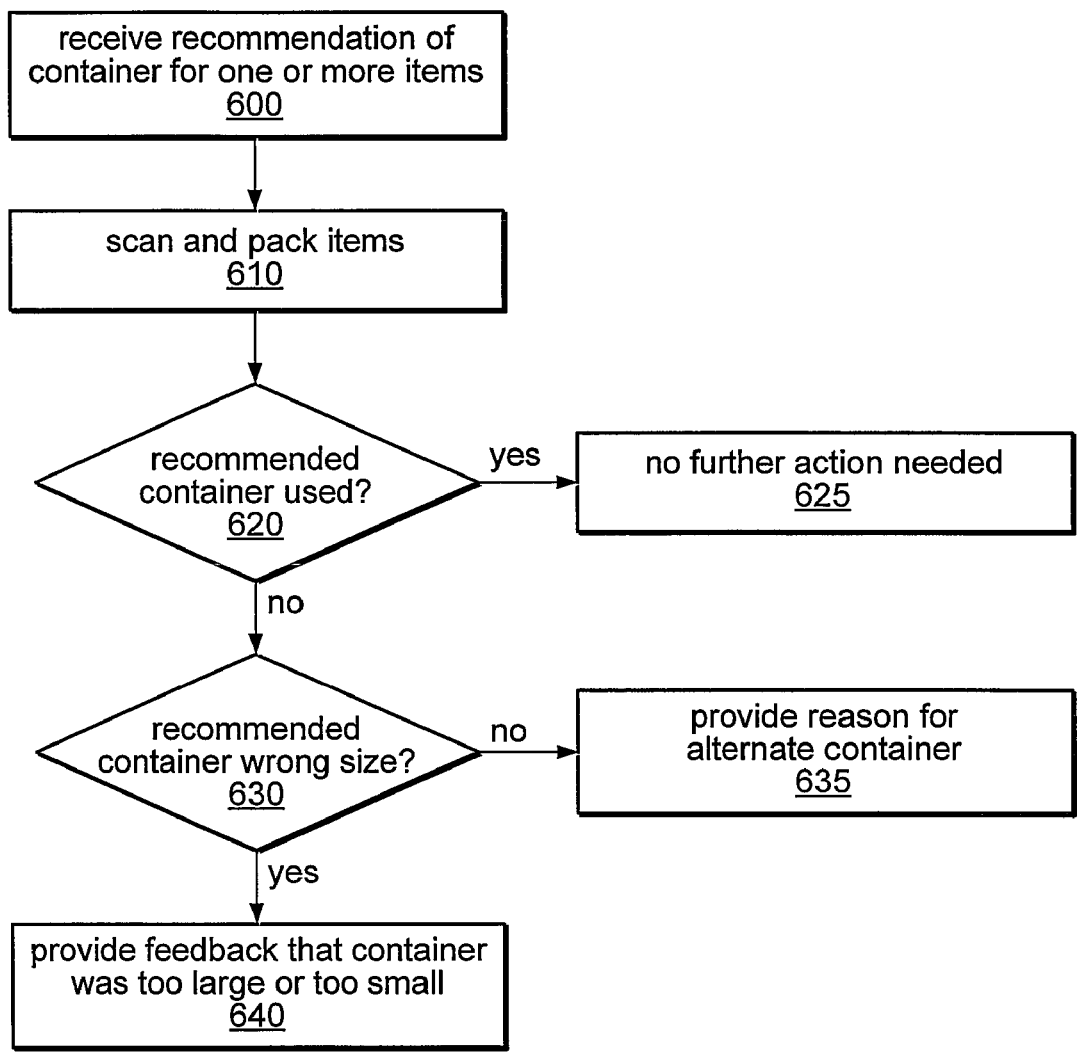
FIG. 4 illustrates a method for providing feedback to a product dimension correction system, according to one embodiment.

One method of providing feedback to a product dimension correction system (e.g., a product dimension correction application) is illustrated by the flowchart in FIG. 4. In this example, an agent or automated system may receive a recommendation of a container for one or more items to be handled in the facility, as in 600. For example, a packing list for an item package (whether electronic or paper) may include a recommendation of a box in which to ship the item package. A packing agent or automated packing mechanism may scan each of the items as they are packed in a box for shipping, as in 610. This information (e.g., an identifier of each of the items and an identifier of the box) may be provided to the product dimension correction system automatically as the items and box are scanned, or may be explicitly provided at a later time (e.g., it may be uploaded when the packaging is complete and/or may include other feedback from the agent or automated operation.)

If the item package is packed in the recommended container, shown as the positive exit from 620, no further action may be required on the part of the agent and/or automated system for this item package. Any information collected as part of the packing operation may be stored in one or more tables, databases, or other data structures for further analysis.

If, however, the item package is not packed in the recommended container, shown as the negative exit from 620, feedback may be provided to the product dimension correction system. In this example, if feedback from an agent or an automated operation indicates that the recommended container was not used because it was the wrong size for the item package (e.g., if it was too small, was larger than necessary to contain the items, or was the wrong shape to contain the items), shown as the positive exit from 630, this information may be included in feedback provided by the agent or automated system, as in 640. If, on the other hand, the recommended container was appropriately sized for the item package but was not used, shown as the negative exit from 630, the agent or automated system may provide feedback regarding the reason that the recommended container was not used, as in 635. For example, the feedback may indicate that the recommended container may not have been available, that the recommended container was not strong enough for shipping heavy or fragile items included in the item package, or that the recommended container may not have been made of a material suitable for shipping fragile or sharp-edged items (e.g., the recommended container may be flexible, rather than stiff, or may be easily punctured.) As noted above, any feedback provided by an agent or collected automatically by the system may be accessed by a package performance analyzer, as described in more detail below.

As noted above, a product dimension correction system may use various methods for detecting inaccurate item dimension values and/or for correcting those values. One method for detecting and correcting inaccurate item dimension values is illustrated by the flow chart in FIG. 5. In this example, the product dimension correction system may have received an indication that the actual container used to handle an item package was different from a recommended container and may be configured to determine why they were different and/or if any corrections should be applied to stored item dimension values. The method illustrated in FIG. 5 includes calculating a volumetric utilization for the item package in the recommended container, shown as 400. For example, calculating a volumetric utilization for the recommended container may involve calculating the volume of the recommended container (e.g., based on stored container dimension values) and calculating the total volume of the items in the item package (e.g., based on the currently stored item dimension values). In this example, the total volume of the items may be calculated as the sum of the calculated volumes of each of the items, or may be calculated as the volume of a bounding box having dimensions just large enough to contain the items according to a currently used packing algorithm or procedure. The volumetric utilization may then be calculated as the ratio of the total volume of the items in the item package to the volume of the recommended container (e.g., the volume of the items divided by the container volume or as a percentage of the container volume). Similarly, the method may involve calculating a volumetric utilization for the item package in the actual container, shown as 410.

As illustrated at 420 of FIG. 5, the method may include comparing the volumetric utilizations of the recommended container and the actual container to see if they are equal. If they are equal, shown as the positive exit from 420, no changes may be needed in the item dimension values, as shown in 430. If, however, the volumetric utilizations are not equal, shown as one of the negative exits from 420, corrective action may be performed. For example, if the comparison indicates that the recommended container was larger than necessary (e.g., if the volumetric utilization of the recommended container was less than the volumetric utilization of the actual container), a counter (e.g., a "suspect dimensions counter") associated with each of one or more items in the item package may be incremented, as in 422. This value of each counter may indicate the number of times that the item dimensions of the associated item were considered suspect. For example, if a given item is included in three item packages for which the volumetric utilization of the recommended container was less than the volumetric utilization of the actual container, the suspect dimension counter value associated with the item may be three.

Similarly, if the comparison indicates that the recommended container was too small (e.g., if the volumetric utilization of the recommended container was greater than the volumetric utilization of the actual container), a suspect dimension counter associated with each of one or more items in the item package may be incremented, as in 421. In some embodiments a single suspect dimension counter value may be incremented when an item is included in an item package for which the recommended container is too large or too small, while in other embodiments, two suspect dimension counter values may be associated with each item (e.g., one indicating the number of times the item was included in an item package for which the recommended container was too large and another indicating the number of times the item was included in an item package for which the recommended container was too small.)

In the example illustrated in FIG. 5, if the suspect dimension counter value indicating the number of times that a given item was included in an item package for which the recommended container was too large exceeds a pre-determined threshold, further action may be taken. This is illustrated as the positive exit of 424. For example, in some embodiments, further action may be taken each time an item package is packed in a container smaller than a recommended container (e.g., the threshold may be set to a value of one). In other embodiments, further action may not be taken until or unless a given item is included in two or more item packages that are packed in a container smaller than a recommended container (e.g., the threshold may be set to a value of two or higher.) In some embodiments, setting the threshold to a value of two or higher may result in excluding individual human errors, such as a wrong box bar code being scanned or items being squeezed into a smaller box than is optimal for the item(s), and may result in identifying only those item packages that are likely to include items for which inaccurate dimensions are currently stored. At 426, in this example, any items for which the associated suspect dimension counters have exceeded the threshold may be flagged for a measurement. If the suspect dimension counter value does not exceed the pre-determined threshold, no further action may be taken. This is shown as the negative exit from 424.

Similarly, if the suspect dimension counter value indicating the number of times that a given item was included in an item package for which the recommended container was too small exceeds a pre-determined threshold, further action may be taken. This is illustrated as the positive exit of 423. As in the previous example, such a threshold may be set to a value of one, or may be set to a value of two or higher to exclude one-time errors other than inaccurate item dimensions. If the threshold is exceeded for one or more items, the items may be flagged for a measurement, as in 425. If the threshold is not exceeded, shown as the negative exit from 423, no further action may be taken. As noted above, in some embodiments, a single suspect dimension counter value may be used to count the number of times that a given item is included in an item package that is packed in a different container than a recommended container, regardless of whether the container is too large or too small for the item package. In such embodiments, a single threshold may be set for the number of time the item's dimensions are considered suspect before the item is flagged for measurement.

Items for which the suspect dimension counter exceeds a threshold, and whose dimensions are considered suspect, may in some embodiments, be flagged for immediate measurement by the product dimension correction system (e.g., a measurement may be initiated and performed before any more of the items are allowed to be packaged and/or shipped.) In other embodiments, the product dimension correction system may be configured to periodically determine the items flagged as having suspect item dimensions and to sort them according to those most likely to have inaccurate item dimensions. For example, in one embodiment, the twenty items having the highest suspect dimension counter values each day may be flagged for a measurement overnight. In another example, all items for which the suspect dimension counter value exceeded a pre-determined threshold during the day may be added to a running list of items to be measured and may be removed from the list (and their suspect dimension counters reset or cleared) after they are measured.

In the example illustrated in FIG. 5, once any items flagged for measurement have been measured, the stored dimensions associated with the items may be updated according to the measured values, as in 440. Updating an item's dimensions may include replacing a currently stored value with a newly measured value, updating a range of allowable values for an item having variable dimensions, and/or updating a confidence level for an item's dimensions, in various embodiments. For example, in one embodiment, a confidence level associated with each item may be dependent on how recently an item has been measured (e.g., using a CubiScan™ machine) or on a number or percentage of item packages that include the item that were packaged in a recommended container. In some embodiments, an item's dimensions may be considered to be trusted dimensions if a confidence level associated with the item exceeds a given threshold, or if the item has been measured within a given time period, as previously described.

In some embodiments, when an item is flagged for a measurement and is measured, if the newly measured values of its dimensions differ from previously stored item dimensions, the previously stored item dimensions may be replaced by the new measurements, and (optionally) a confidence level associated with the item may be raised. Alternately, if the newly measured values match the previously stored values, the item dimension may not be updated, but a confidence level may be raised. Thus, in some embodiments, each time an item is measured, a confidence level associated with the item's dimensions may be raised (or validated.) In other embodiments, a confidence level may be raised (or validated) each time the item is included in an item package that is packed in a recommended container and may be lowered (or invalidated) each time it is included in an item package that is packed in a container different than a recommended container.

The algorithms used by the product dimension correction system are not intended to be limited to those described above and may include any other algorithms suitable for determining if item dimensions associated with any items in an item package are inaccurate dependent on an actual container used to handle the item package, according to different embodiments. For example, the product dimension correction system may use different packing algorithms to determine a recommended container for an item package, or may use a combination of measured and observed data (e.g., observations input to the system by a packing agent) to determine if a recommended container is the most suitable container for a given item package. In another example, the product dimension correction system may in some embodiments flag all packaging incongruities for manual inspection (e.g., for measurement of one or more items included in the item package) at the time the incongruities are detected, rather than flagging individual items for measurement based on detection of two or more incongruities in a given time period.

A product dimension correction system may use a different method than that described above for determining which, if any, items included in an item package handled in a container other than a recommended container should be measured, in different embodiments. For example, instead of maintaining a count of the number of times an individual item has been included in an item package when a packaging incongruity is detected, the system may be configured to maintain a list of item packages for which packaging incongruities have been detected. This list may be analyzed to determine if the item packages include any common items (e.g., by comparing the identifiers of the items included in each item package.) In some embodiments, if an item identifier appears on more than a pre-determined number of item package lists for which packaging incongruities have been detected, that item may be flagged for a measurement (e.g., by adding it to a list of items having suspect dimensions.) Similarly, if items included on an item package list associated with a single packaging incongruity are not included on the item package lists associated with any other packaging incongruities, those items may be eliminated from a list of items with suspect dimensions. By repeatedly comparing the items included in item packages for which packaging incongruities are detected, the product dimension correction system may in some embodiments be configured to narrow down the list of items for which stored item dimensions are suspect and to reduce the number of items flagged for measurement. For example, in one embodiment, the product dimension correction system may be configured to examine a list of item packages associated with packaging incongruities and a list of item packages that were packaged in recommended containers once per day and to generate a list of items having suspect dimensions by identifying those items that are common among item package lists and eliminating those that are common among item packages packaged in a recommended container.

The product dimension correction system may be further described using the following example. In this example, an e-commerce organization sells items of various types that can be shipped to customers. For the sake of simplicity, five example items are shown in an item parameter data store, in Table 1, below. In this example, each item has a corresponding unique identifier, name, and type in columns 1-3. The item parameter data store also includes columns for storing values for various parameters of each item (columns 4-6), which in this example includes the item height, length, and width. The values in column 7, in this example, indicate a count of the number of times the item dimensions have been considered suspect for each item (e.g., the number of times that the item was included in an item package that was packaged in a container other than a recommended container.)

TABLE 1

| item ID | item name | item type | item height (in) | item length (in) | item width (in) | suspect dimension count |
|---|---|---|---|---|---|---|
| 4982 | book1 | book | 8.40 | 6.40 | 2.59 | 0 |
| 4325 | book2 | book | 8.29 | 6.40 | 2.59 | 15 |
| 2309 | book3 | book | 8.59 | 6.40 | 2.59 | 1 |
| 0873 | shoe17 | shoe | 14.00 | 8.00 | 6.54 | 5 |
| 1832 | DVD1 | DVD | 7.48 | 5.31 | 0.55 | 0 |

While not shown, in other embodiments additional information may be stored in an item parameters data store, such as a confidence level for the item dimension values, information on statistical variances in the dimension values, or other indications of allowable deviations from the dimension values. In some embodiments, determining a confidence level for one or more of the dimensions of an item may involve repeated measurements (such as measurements performed in response to detected packaging incongruities), followed by calculation of a mean or standard deviation, or detection of a trend, rate of change, or other pattern in the measurements. In some embodiments, a product dimension correction system may count the number of times (or percentage of times) that an item is packaged in a recommended container to determine a confidence level for the item's dimensions.

In one example, a manufacturer or supplier may provide item dimensions for the items shown in Table 1. These may be used as the initial or default item dimension values that are used to recommend a container in which each item may be packaged, either alone or along with other items in an item package, until or unless any measurements of the item are initiated in response to a packaging incongruity.

As previously described, the product dimension correction system may, in some embodiments, capture container, portal, or path information, such as container, portal, or path dimensions, container contents, or identifiers of items passing through a portal or on a path. In some embodiments, dimensions and/or other parameter values for the containers, portals or paths may be stored in one or more tables, databases, or other data structures, such as the container parameters data store illustrated in Table 2 below. In this example, a container identifier, a container name, and a container type are stored in each entry of Table 2 in columns 1-3. Dimension values for various containers, portals, and paths are shown in columns 4-9. In some embodiments, a manufacturer or supplier of a container may provide the values of various container parameters, including container dimensions. In other embodiments, container, portal, or path parameters may be determined by measuring one or more instances of each container, portal, or path type.

As used in describing the example embodiments herein, references to a "container" may include any dimensionally-constrained environment, including conventional containers (e.g., boxes, bins, and the like), portals (doorways, hatches, etc.) and dimensionally-constrained paths (chutes, tracks, conveyor belts, etc.), as described herein. In this example, the available "containers" include three types of boxes in which items may be shipped (as shown in rows 1-3 of the data store), three types of containers or paths in which items may be conveyed in the materials handling facility (as shown in rows 4-6 of the data store), two types of containers in which items may be stored in the materials handling facility (as shown in rows 7-8 of the data store), and one portal through which items may pass in the facility (as shown in row 9 of the data store).

TABLE 2

| container ID | container name | container type | height (inches) | length (inches) | width (inches) |
|---|---|---|---|---|---|
| 413 | smallbox1 | box | 19.0 | 13.0 | 11.75 |
| 293 | smallbox2 | box | 22.0 | 18.0 | 11.75 |
| 338 | bigbox1 | box | 24.00 | 16.00 | 16.00 |
| 103 | tote1 | tote | 24.00 | 24.00 | 12.00 |
| 391 | cart2 | cart | 48.00 | 36.00 | 24.00 |
| 789 | belt1 | belt | — | 47.50 | 24.00 |
| 651 | bin7 | bin | 27.00 | 18.00 | 15.00 |
| 265 | shelf3 | shelf | 33.00 | 27.00 | 18.00 |
| 739 | gate7 | portal | — | 60.00 | 48.00 |

In the example illustrated by Table 2, the values for the height, length, and width are shown for each container except for the conveyor belt, labeled belt1, and the portal, labeled gate7. In some embodiments, a manufacturer or supplier may provide the volume along with the dimensions, while in other embodiments, the product dimension correction system may calculate the volume from supplied or measured dimensions. In this example, the length of belt1 may not be specified because the conveyor belt length may not be a restricting dimension. That is, as long as an item may be placed on the belt (without overlapping its width) and is not too tall to pass through any spaces in the materials handling facility through which the conveyor belt passes, the item may be said to "fit" on the conveyor belt. Similarly, the length of gate7 may not be specified because it may not add any constraints on the items that pass through gate7.

In some embodiments, the product dimension correction system may store recommended and actual container dimensions for item packages in a table, database, or other data structure, such as Table 3 below, and may use this information to determine if dimensions of one or more items of an item package are suspect or inaccurate. In this example, Table 3 illustrates a package parameters data store, in which each entry (row) includes information about actual versus recommended containers for item packages handled in the materials handling facility. Note that in some embodiments the grouping of items within containers may be temporary and may change with various operations of the facility. For example, items for several orders may be placed together in a tote during a "pick" operation and then sorted into different groups, by order, and placed into boxes for shipping. Therefore, the information stored in a package parameters data store, such as the one illustrated by Table 3, may, in some embodiments, represent snapshots in time for particular containers and those containers may contain other items at other times. Each of these snapshots may include a unique group or package identifier, as shown in column 1, in some embodiments. In other embodiments, a package identifier may correspond to a particular customer order or container, rather than a snapshot of an item grouping.

In this example, each entry includes a list of the container contents (e.g., the contents of an item package) along with the number of copies of each item included in the item package, and the identifier, length, height, and width of both the recommended container and the actual container. For example, in Table 3, column 3 is used to store the name of the container recommended to handle each item package, and columns 4-6 are used to store the height, length, and width of the recommended container, respectively. Similarly, column 7 is used to store the name of the actual container used to handle each item package, and columns 8-10 are used to store the height, length, and width of the actual container, respectively. In another embodiment, the recommended and/or actual container dimensions may not be included in the package parameters data store if it is already stored in another data store, such as the one illustrated by Table 2. In some embodiments, additional information may be stored in a package parameters data store, such as a date or timestamp for each entry or a batch number or other identifier of specific item or item group instances (not shown). In other embodiments, more, fewer, or different parameters may be stored in a package parameters data store, or similar information may be stored in other combinations in one or more other tables, databases, or other data structures.

TABLE 3

| package ID | package contents | Recom. cont. | R ht. | R lg. | R wd. | Actual cont. | A ht. | A lg. | A wd. |
|---|---|---|---|---|---|---|---|---|---|
| 872093 | book 1 × 2, book 2 × 6, book 3 × 6 | smallbox2 | 22 | 18 | 11.75 | smallbox1 | 19 | 13 | 11.75 |
| 832189 | book 1 × 3, book 2 × 4, book 3 × 7 | smallbox2 | 22 | 18 | 11.75 | smallbox2 | 22 | 18 | 11.75 |
| 098731 | book 2 × 12, DVD 1 × 2 | smallbox1 | 19 | 13 | 11.75 | smallbox1 | 19 | 13 | 11.75 |

TABLE 3-continued

| package ID | package contents | Recom, cont. | R ht. | R lg. | R wd. | Actual cont. | A ht. | A lg. | A wd. |
|---|---|---|---|---|---|---|---|---|---|
| 631248 | book 1 × 4<br>book 2 × 8<br>shoe 17 × 3 | bigbox1 | 24 | 16 | 16 | bigbox1 | 24 | 16 | 16 |

In some embodiments, the information captured and stored in data stores such as those illustrated by Tables 1, 2, and 3 may be collectively used by the product dimension correction system to identify inaccurate dimensions currently associated with items in the materials handling facility. For example, the parameter values illustrated in Tables 1, 2, and 3 may be used to determine that the item dimensions for items book1, book2, and book3 items are suspect, using the methods illustrated in FIGS. 3, 4, and/or 5. In this example, the recommended container and the actual container in which item package 872093 was handled were different, with the actual container being smaller than the recommended container. This may indicate that the currently stored item dimensions of one or more of the items in the item package may be inaccurate (in this case, they may be suspected to be larger than the actual dimensions of the items). In this example, since the suspect dimension count for book2 exceeds a pre-determined threshold of 5, the product dimension correction system may be configured to initiate a measurement of item book2. Measurement of items book1 and book3 may in some embodiments be given a lower priority, since the suspect dimension counts for these items are much lower. If the measured item dimensions for item book2 are different than those listed in Table 1, the item dimension values stored in Table 1 may be corrected and used for future container recommendations. In this case, an associated confidence level may also be updated for the item, in some embodiments.

As previously described, the product dimension correction system may analyze information stored in the various data stores, as described above, to validate previously measured or supplied values for item dimensions, in some embodiments. For example, if item book1 is also measured and is found to have item dimensions matching those in Table 1, a confidence level associated with the stored dimension values of item book1 may be raised.

While many of the examples described above involve item packages that include two or more items, the methods may be applied by the system to recommend a container suitable for handling a single item in the materials handling facility and to determine if item dimensions are inaccurate based on the actual container used to handle the item, in other embodiments.

In some embodiments, such as those described herein, it may be assumed that all items in a group must fit entirely into each of the containers in the materials handling facility into which they are placed. In other embodiments, this restriction may not be required. For example, in some embodiments, it may be permissible for items to stick out of the top or side of a tote, belt, etc., when being stored or transported within the materials handling facility. In these embodiments, there may need to be additional information input to the system to allow inaccurate item dimensions to be determined and/or corrected, such as by detecting differences between recommended and actual containers only when these items are placed into containers in which they must be completely contained, such as for shipping.

As previously noted, maintaining correct item dimension values for items in a materials handling facility may in some embodiments facilitate item identification for a picking operation. For example, if a copy of item book3 is on a pick list, an agent may be directed to an inventory area containing a copy of this item along with one or more copies of item book2. In this example, the agent may be directed to select the "tallest" book from this area, as the height of item book3 is 8.59 inches and the height of item book2 is 8.29 inches, as shown in Table 1.

Package Performance Analyzer

As noted above, a package performance analyzer may in some embodiments be used as a performance management tool within a materials handling facility, to measure and continuously improve the performance of packaging-related and shipping-related operations. For example, the package performance analyzer may be implemented as a software application configured to determine excess shipping costs incurred as a result of shipping item packages in inappropriately sized containers, as described above.

A package performance analyzer may in some embodiments be configured to generate packaging performance reports based on information collected from the various operations of the facility and on expected and actual shipping costs calculated by the package performance analyzer. For example, the package performance analyzer may in some embodiments be configured to produce a summary of container types used in the facility, a comparison of container types used vs. recommended container types, a comparison of actual shipping costs vs. expected shipping costs, mismatches between recommended and actual containers used within the facility, and costs associated with these container mismatches. In some embodiments, the data included in reports generated by the package performance analyzer may be sorted by time/date or time/date range, by item package identifiers, by location, by site, by facility, by process path, by packing station, and/or by agent. The information in the reports may be presented in terms of raw data (e.g., a count of each event being reported), or as a percentage of events being reported, in different embodiments. Examples of the types of reports that may be generated by the package performance analyzer are described below. In other embodiments, other types of packaging performance reports that may be useful in assessing and improving the operations of a materials handling facility may be generated by the package performance analyzer based on the information accessible to the package performance analyzer.

A package performance analyzer may be implemented within the facility in one or more software modules executing on one or more nodes of a computing system (e.g., as program instructions and data structures configured to implement functionality described), or in any combination of hardware and software components suitable for implementing the functionality described. It may be configured to receive inputs from other software applications, agents working in the facility or remotely, and/or automated systems within the facility (e.g., scanners, sensors, automated storing, picking, or packing equipment, or software applications managing one or more local or remote data stores.) For example, when an item package is placed in a container for shipping, a container identifier (e.g., a bar code) and an item package identifier may automatically be scanned, or these identifiers may be input by a packing agent. In addition, an identifier of the packing station and/or agent responsible for packing the item package for shipping may be automatically captured or manually input. Any or all of this information, along with other information received from and/or stored by other operations in the materials handling facility may serve as inputs to the package performance analyzer.

Figure 6:
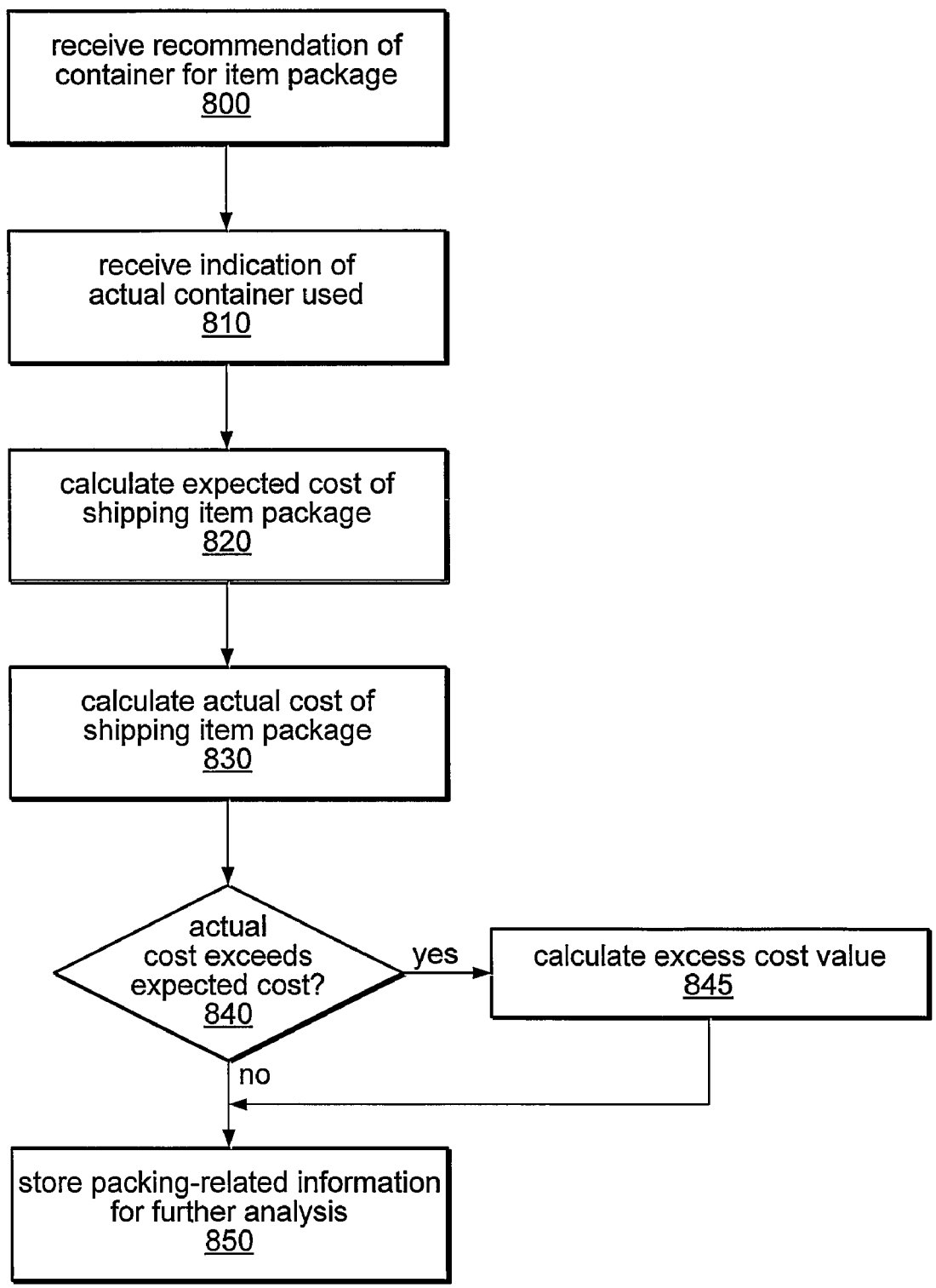
FIG. 6 illustrates a method of performing package performance analysis, according to one embodiment.

A method for carrying out package performance analysis, according to one embodiment, is illustrated in FIG. 6. In this example, a recommendation of a container for an item package may be received, as in 800. In some embodiments this recommendation may be generated dependent on stored item dimension values, as described herein. The method may also include receiving an indication of the actual container used to handle the item package, as in 810. As noted above, this indication may be automatically captured or may be input (or caused to be captured), by an agent in the facility, in different embodiments.

As illustrated at 820, the method may include calculating an expected cost of shipping the item package. The expected shipping cost may in some embodiments be calculated as the sum of the expected transportation cost and the expected shipping materials costs associated with shipping the item package in the recommended container. The expected transportation cost may be determined by another software application executing on one or more nodes of a computing system, such as a transportation method selector, configured to determine the most cost-effective shipping method for a given item package based on various factors including, but not limited to, size (i.e., the size of the recommended container), weight (e.g., the total weight of the items in the item package and the shipping materials), the requested delivery time (e.g., overnight, 2-day, or ground shipping) and the destination, in different embodiments.

In some embodiments, the package performance analyzer may be configured to call the transportation method selector to request an expected shipping cost for an item package and may provide the transportation method selector with an indication of the item package contents and any non-item contents as an input to the selection process. For example, the package performance analyzer may be configured to determine that the item contents plus ten air bag fillers may be handled in the recommended container and to pass this information to the transportation method selector. In such embodiments, the transportation method selector may be configured to access one or more tables, databases, or other data structures, such as an item parameters data store (such as that illustrated in Table 1) and/or a container parameters data store (such as that illustrated in Table 2), in order to obtain the weight of the items and shipping materials. In other embodiments, the package performance analyzer may be configured to obtain the weight of the items and shipping materials and to pass this information to the transportation method selector for use in determining the most cost-effective shipping method and the corresponding transportation cost for the item package.

The expected shipping materials costs may include the cost of the recommended container itself, as well as the costs of any non-item contents expected to be included in the container when it is shipped. For example, the container may be expected to contain air bags or foam used as padding or filler, promotional inserts from the organization, or other non-item contents, in some embodiments. The non-item contents expected to be included may be determined according to current standard procedures for filling containers, and/or current advertising guidelines for various types of item packages or customers, in various embodiments. For example, in some embodiments, the package performance analyzer may be configured to determine the number of air bags needed to fill empty spaces in the recommended container along with the item package contents according to a standard packing algorithm. Therefore, the expected shipping materials costs for one item package may be the sum of the container costs (e.g., $1.20) and the cost of the air bags (e.g., 10 air bags at a cost of $0.03 each, or $0.30). The package performance analyzer may in some embodiments be configured to access one or more tables, databases, or other data structures, such as an item parameters data store (such as that illustrated in Table 1) and/or a container parameters data store (such as that illustrated in Table 2), in order to obtain the costs of the shipping materials. If the transportation cost of the item package (when shipped in the recommended container) is $6.37, in this example, then the total expected shipping cost may be $7.87.

As illustrated in FIG. 6, the method may also include calculating the actual shipping cost of the item package. The actual shipping cost may in some embodiments be calculated as the sum of the actual transportation cost and the actual shipping materials costs associated with shipping the item package in the actual container. The actual transportation cost may be determined by the transportation method selector dependent on size (i.e., the size of the actual container), weight (e.g., the total weight of the items in the item package and the shipping materials), the requested delivery time (e.g., overnight, 2-day, or ground shipping) and the destination, in different embodiments. In other embodiments, the actual transportation cost may be obtained from another operation of the materials handling facility, such as from a shipping services or financial services operation, and may reflect the amount actually invoiced and/or paid for shipping the item package in the actual container. Using the example above, if the actual container is larger than the recommended container and the actual shipping cost is $8.53, the excess shipping cost due only to the shipping cost is $2.16.

The actual shipping materials costs may in some embodiments be calculated in a manner similar to that described above regarding the expected shipping materials costs. For example, the package performance analyzer may in some embodiments be configured to obtain the costs of the actual package and any other non-item shipping materials that would be included in the package (according to current practices) from one or more data stores, such as those described above. In other embodiments, an indication of the actual non-item materials content may be input automatically by the system (e.g., as it is added to the container) or manually by an agent. Using the example above, if the actual container is larger than the recommended container and costs $1.87, the total actual shipping cost is $11.00. In this example, the excess shipping cost due to the wrong container being used is $0.67.

Note that in some embodiments, only non-item contents that are affected by the container choice may be included in the package performance analysis. For example, if the same promotional materials would be included with an item package regardless of the size of the container, this information may not be considered when determining the expected shipping cost and/or the actual shipping cost, since it would not affect the comparison of the two. Conversely, the number of air bags added to an actual container and a recommended container may not be the same, as more filler may be required to protect the item package contents in a larger container than a smaller one. Using the example above, if twenty air bags are needed to fill the empty space in the actual container (rather than the ten air bags expected to be used in the recommended container), then excess shipping materials cost due to the non-item contents may be $0.30.

As illustrated in FIG. 6, the method may include determining if the actual shipping cost exceeds the expected shipping cost, as in 840. In some embodiments, this may be performed by comparing the two values, or by subtracting one from the other, for example. If the actual shipping cost exceeds the expected shipping cost for this item package, illustrated as the positive exit from 840, the method may include calculating the excess cost value, as in 845. In some embodiments, this may be calculated as the difference between the two values. In the example above, the difference between the expected shipping cost and the actual shipping cost is $3.13.

The method may also include storing packaging-related information for further analysis, as in 850. For example, in some embodiments, any or all of the item package identifier, expected shipping cost (and/or any of its components, such as the transportation cost or container cost), actual shipping costs (and/or any of its components), excess cost value, recommended container identifier, actual container identifier, identifier of an agent or packing station responsible for packing the item package for shipping, or any other relevant information may be stored in one or more tables, databases, or other data structures for analysis by the package performance analyzer or another operation of the materials handling facility.

The method illustrated in FIG. 6 may in some embodiments be executed continuously in the materials handling facility. For example, the package performance analyzer may be configured to receive information regarding the recommended and actual containers used to ship each item package automatically as part of the packing and/or shipping operations. In some embodiments, receiving this information may automatically trigger an analysis of the item package. In other words, the package performance analyzer may perform the operations illustrated in FIG. 6 shortly after an item package is packed and/or shipped in response to the item package being packed and/or shipped. In other embodiments, the operations illustrated in FIG. 6 may be performed by the package performance analyzer on a pre-determined schedule or in response to a request for a package performance report. For example, the package performance analyzer may in some embodiments be configured to perform the operations illustrated in FIG. 6 at the end of each shift for all the item packages that were packed and/or shipped during the shift. In such embodiments, the package performance analyzer may also be configured to generate one or more standard reports using the newly generated expected and actual shipping costs. In another embodiment, the package performance analyzer may be configured to perform the operations illustrated in FIG. 6 in response to an explicit indication that they should be performed, such as a user input indicating that an analysis should be performed for all item packages packed and shipped since the last analysis or a user input indicating that one or more reports should be generated.

As noted above, the package performance analyzer may include a user interface component, such as a web browser interface, configured to allow a user to view and/or analyze packaging-related information. For example, a user may access the package performance analyzer through a web browser on a report console and may request that a particular package performance report be generated.

Figure 7:
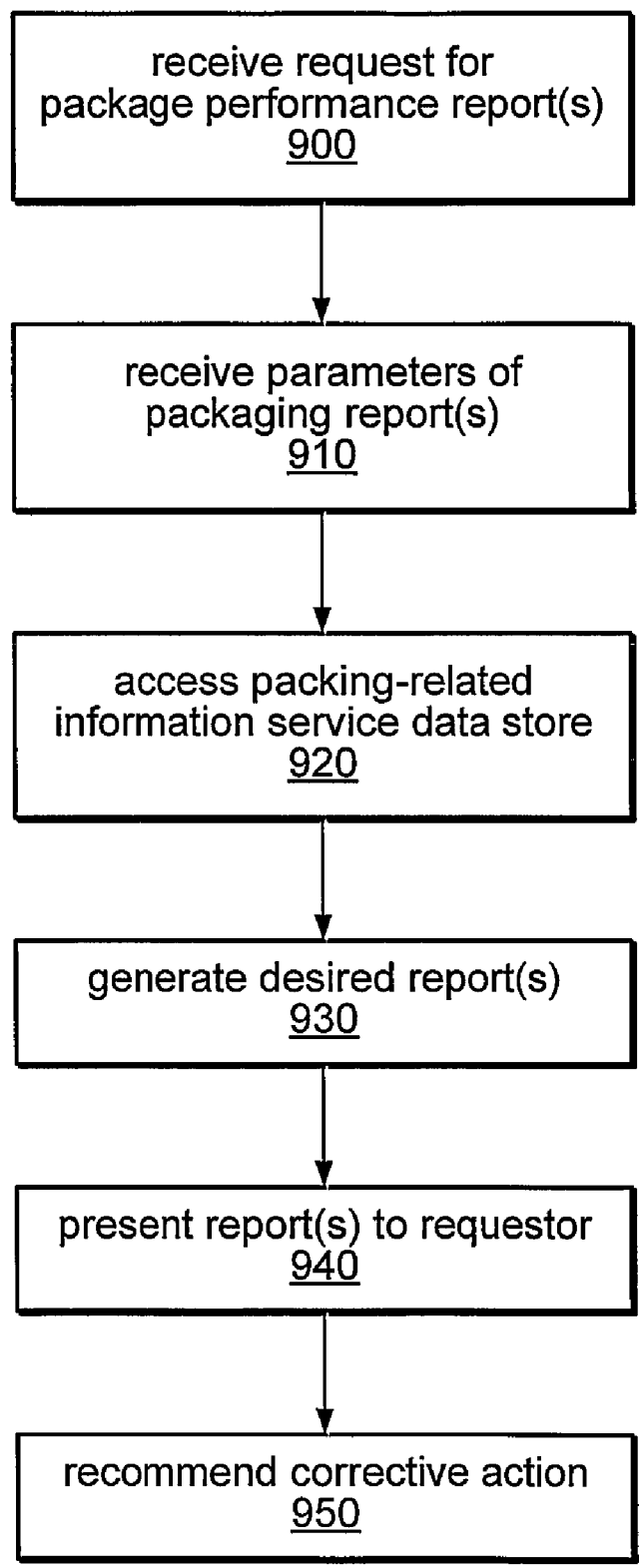
FIG. 7 illustrates one embodiment of a method for generating package performance reports.

One method for providing package performance reports, according to one embodiment, is illustrated in FIG. 7. In this example, a request for one or more package performance reports may be received, as in 900. In some embodiments, a user may select one or more specific report types using a pull-down menu, by selecting one or more radio buttons, or by entering one or more report type names in an input window of a web page, for example.

As illustrated in FIG. 7, the method may include receiving report parameters for the one or more selected package performance reports, as in 910. For example, depending on the report type, the user may in some embodiments be prompted to specify one or more of a time or date; a time or date range; a particular facility, site, location, operation, or agent; an item identifier or an identifier of an item group or type; a threshold above which excess cost values should be reported; or another parameters relevant to the analysis. In some embodiments, default parameter values may exist for any or all parameters corresponding to one or more report types.

Once the report type(s) and any applicable parameters have been specified, the method may include accessing packaging-related information from one or more data stores, such as those described herein. This is shown as 920. For example, if a user has requested a report comparing expected vs. actual shipping costs for all item packages in the facility in the last week, the package performance analyzer may be configured to access these costs from the data store in which it stored them when the item package was shipped. Similarly, if a user has requested a report summarizing the excess shipping costs associated with a particular agent in the facility, the package performance analyzer may be configured to search one or more data stores for entries corresponding to item packages packed by the agent and for which an excess shipping cost was calculated (i.e., for which actual shipping costs exceeded expected shipping costs.) In some embodiments, a user may specify a format for the requested reports using the parameter input mechanisms (e.g., a tabular output, an output graph, data represented as a count of events or entries, or data represented as a percentage of events or entries.)

As illustrated in FIG. 7, once the necessary information has been extracted from the appropriate data stores, the requested reports may be generated, as in 930. For example, generating the requested reports may include sorting the extracted data, performing one or more mathematical transformations on the data (e.g., aggregated costs, averaging costs, counting a number of entries matching the report parameters, calculating the percentage of entries matching the report parameters, etc.) Generating the requested reports may in some embodiments include formatting the requested information according to the specified report parameters. For example, a report summarizing the reasons given for a mismatch between recommended and actual containers may be formatted as a pie chart or bar graph, in different embodiments.

Once the requested reports have been generated, they may be presented to the requestor, as in 940. For example, reports in a tabular and/or graphical format may be displayed on a computer system, such as in a web browser window on a report console, in some embodiments. In other embodiments, reports may be printed, emailed, or otherwise transmitted to one or more interested parties. For example, in some embodiments, a standard set of package performance reports may be generated weekly and transmitted to one or more operations managers in the materials handling facility for review.

The reports generated by the package performance analyzer may be used to identify recurring errors, problems with performance for a particular packing station or agent, poor availability of particular container types, or other packaging-related performance issues that may be contributing to container waste, product damage, and/or avoidable excess shipping costs, in some embodiments. In some embodiments, the package performance analyzer may be configured to identify performance issues from the report data and to recommend corrective action, as in 950. Feedback received from the various operations of the facility may also be used in determining performance issues and/or appropriate corrective actions. For example, if report data indicated that a particular packing agent is responsible for packing an inordinately large number of item packages in containers larger than the recommended containers, the package performance analyzer may be configured to recommend additional training for the agent. On the other hand, if report data indicates that the reason a particular recommended container was not used for a large number of item packages is that it was not available, the package performance analyzer may instead be configured to recommend that more of the particular container type be stocked and/or assembled for use in the facility or in the particular processing path for which it was not available.

While the methods described above involve the comparison of shipping costs associated with an actual container to those expected when using a recommended container, a similar analysis may be performed to compare shipping costs associated with an actual container to those expected when using an ideally sized container for an item package. For example, an ideal container may be one having the same interior dimensions as that of a three-dimensional bounding box having sufficient length, width, and height to contain all of the items in the item package, as described earlier. The operations illustrated in FIG. 6 may be applied to this ideal container, rather than a recommended container chosen from available containers in the facility to determine excess shipping costs associated with not having an ideally sized container for the item package. Similarly, the operations illustrated in FIG. 7 may be applied to report generation for the analysis of the excess shipping costs associated with the current suite of available containers. For example, a user may request a report summarizing the excess shipping costs associated with item packages packed in one or more containers in a specified size range, as compared to the expected shipping costs if the item packages had been packed and shipped in ideal container sizes for the item packages.

In some embodiments, the package performance analyzer may be configured to recommend a corrective action that includes a determination of a more cost-effective suite of containers for a typical distribution of item packages packed and shipped at the facility. For example, the recommended corrective action may include adding one or more container types to those available for shipping item packages in the materials handling facility or removing one or more container types from the available containers for shipping item packages, in different embodiments. In another example, the recommended corrective action may include recommending a different mix in the number of each container type to be stocked in the materials handling facility (e.g., on as as-needed or ongoing basis.) The package performance analyzer may in some embodiments also be configured to determine trade-offs between shipping cost improvements and productivity when making recommendations. For example, the most cost-effective system may include enough different container sizes so that each item package may be packed and shipped in an ideally sized container. However, this would be a highly inefficient situation for the packing station. The cost associated with the extra time needed to select the correct container for each item package or to divide the packing operation up into stations that pack a given range of item package sizes into their ideally sized containers may more than make up the difference in the transportation and/or materials cost saving. Therefore, the packing performance analyzer may be configured to determine the impact (in terms of cost) of any productivity losses or gains when evaluating package performance issues and recommending corrective action. If the corrective action is more expensive than the excess shipping costs, it may not be recommended.

Exemplary System Embodiments

Automated product dimension correction, as described herein, may be implemented in one or more software modules executing on one or more nodes of a computing system or using any combination of hardware and software components of a computing system, in various embodiments. Item and container dimension values may be stored in one or more tables, databases, or other data structures maintained on one or more computing system nodes within a materials handling facility and/or remote computing system nodes configured to communicate with the operations of the materials handling facility. Similarly, container recommendations and/or feedback regarding actual containers in which item packages are handled may be exchanged between one or more computing system nodes within a materials handling facility and/or remote computing system nodes configured to communicate with the operations of the materials handling facility.

Figure 8:
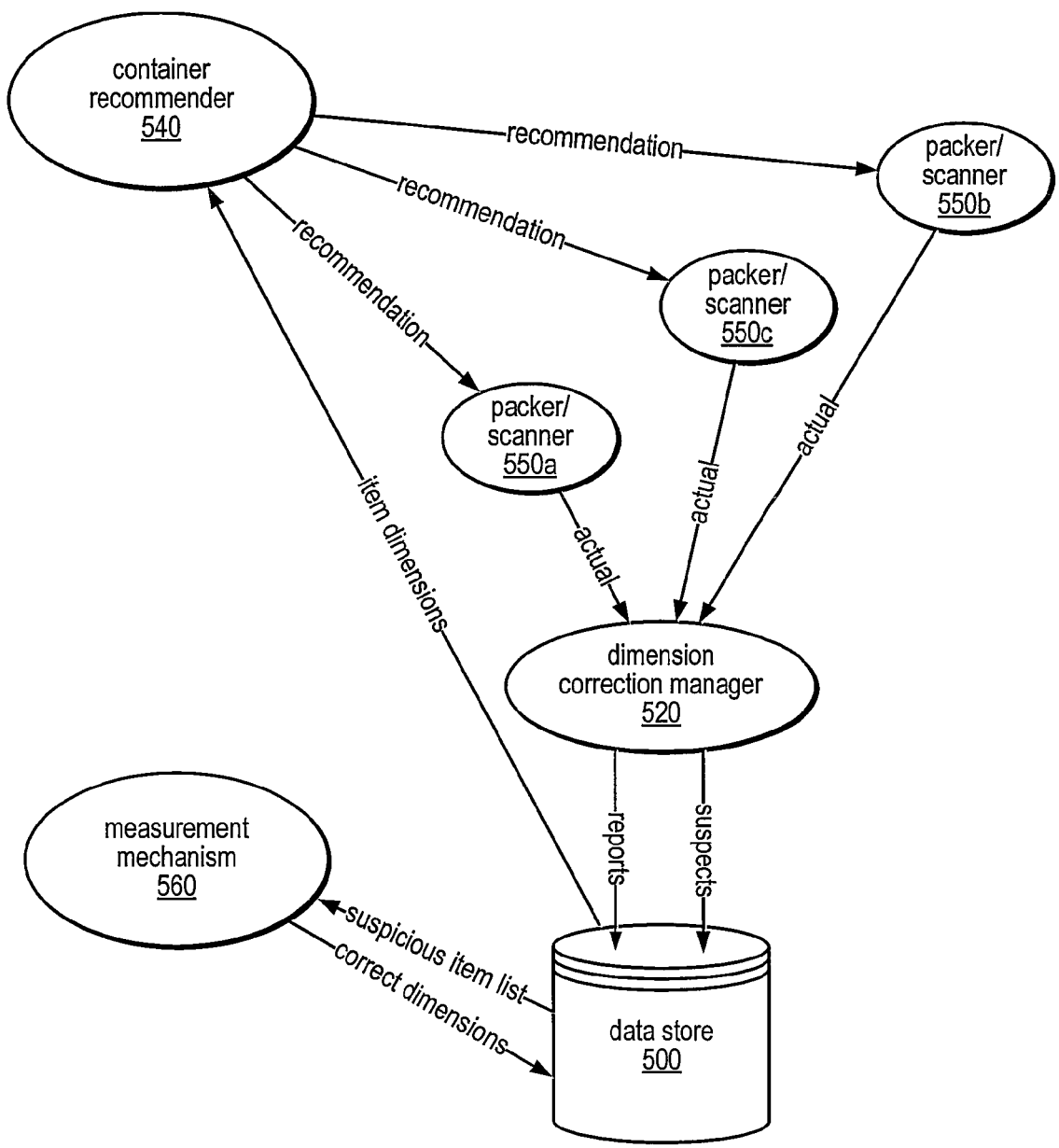
FIG. 8 illustrates a data flow diagram for a system implementing product dimension correction, according to one embodiment.

A data flow diagram for a product dimension correction system, as described herein, is illustrated in FIG. 8 according to one embodiment. The product dimension correction system may include various hardware and/or software components configured to carry out the operations described herein as part of product dimension correction. In this example, data store 500 may be a data store containing item parameter values for all of the items handled within a materials handling facility. A container recommender 540 may access data store 500 to obtain currently stored item dimension values for items in an item package and may use this information to recommend a container in which the item package may be handled, as described above.

As illustrated in FIG. 8, container recommender 540 may provide recommendations of containers suitable for handling item packages to various packer/scanner operations 550. For example, each of the recommendations provided to packer/scanner operations 550*a*, 550*b*, and 550*c* may include a packing list and a recommended container for the items on the packing list. The packer/scanner operations 550 may then provide information regarding actual containers used to handle the item packages to dimension correction manager 520. In this example, dimension correction manager 520 may be configured to determine if the actual container and recommended containers were the same and/or to report any differences between actual and recommended containers for item packages. This is illustrated as reports provided by dimension correction manager 520 to data store 500. In addition, dimension correction manager 520 may be configured to provide a list of items included in item packages for which actual containers are not the same as recommended containers. This is illustrated as suspects provided by dimension correction manager 520 to data store 500.

In the example illustrated in FIG. 8, data store 500 may be a data store located within the materials handling facility itself and accessed by the various operations of the facility. In this example, data store 500 may be configured to determine which, if any, item dimension values may be inaccurate and to provide a list of items to be measured. For example, data store 500 may be configured to increment a suspect dimensions count for each item provided as a suspect by dimension correction manager 520 and to determine if a suspect dimension threshold has been exceeded for those items. Each item for which a suspect dimension threshold has been exceeded may be flagged for measurement. This is illustrated as the suspicious item list provided by data store 500 to measurement mechanism 560.

Measurement mechanism 560 may receive a suspicious item list from data store 500 and may initiate measurement of the items on the list. For example, measurement mechanism 560 may be configured to present a list of items to measure to an agent on a computer terminal display or may transmit such a list to a handheld display device or to an automated picking and/or measuring system. An agent or automated system may then measure the items on the list and provide measured item dimension information to data store 500. This is illustrated as correct dimensions provided by measurement mechanism 560 to data store 500. These correct dimensions may replace inaccurate or outdated item dimension values previously stored by data store 500 and/or may validate or raise a confidence level for item dimension values previously stored by data store 500. These correct dimension values may then be provided to container recommender 540 the next time the measured items are included in an item package for which a container recommendation is being made.

While the embodiment illustrated by FIG. 8 includes a dimension correction manager 520, a container recommender 540, and a measurement mechanism 560 that are separate components of a system configured to perform dimension correction, in other embodiments, the functionality described as being performed by each of these components may all be performed by sub-components of a single system component, or may be partitioned in other ways. For example, in one embodiment, container recommender 540 may be implemented as a module of a software application configured to implement dimension correction manager 520. In another example, data store 500 may be located in a memory of the same computing node or of a different computing node than a memory that includes program instructions configured to implement dimension correction manager 520 and/or container recommended 540.

In some embodiments, the product dimension correction system may also include a remote data store, such as a data store located at a headquarters of a company operating the materials handling facility. In some embodiments, metrics may be provided by data store 500 to such a remote data store concerning the operations of the materials handling facility. For example, metrics may be provided indicating the number or percentage of item packages that were handled in a recommended container in a given time period, the number or percentage of item packages that were handled in a container larger or smaller than a recommended container in a given time period and/or why, the number or percentage of item dimensions that were corrected in a given time period and/or for items from a particular manufacturer or supplier, or the number of items measured and/or found to be associated with inaccurate item dimensions in a given time period. These and/or other metrics that may be extracted from data store 500 may be analyzed and compared to similar metrics received by a remote data store from other materials handling facilities, in some embodiments. For example, these metrics may be used to identify best practices at one or more materials handling facilities. In another embodiment, corrected item dimensions may be provided to a remote data store by data store 500 and these may be distributed to other materials handling facilities configured to exchange information with the remote data store.

Package performance analysis, as described herein, may be implemented in one or more software modules executing on one or more nodes of a computing system or using any combination of hardware and software components of a computing system, in various embodiments. Item and container cost and parameter values (e.g., dimensions and/or weight) may be stored in one or more tables, databases, or other data structures maintained on one or more computing system nodes within a materials handling facility and/or remote computing system nodes configured to communicate with the operations of the materials handling facility. Similarly, packaging-related information and/or feedback regarding actual containers in which item packages are handled may be exchanged between one or more computing system nodes within a materials handling facility and/or remote computing system nodes configured to communicate with the operations of the materials handling facility.

Figure 9:
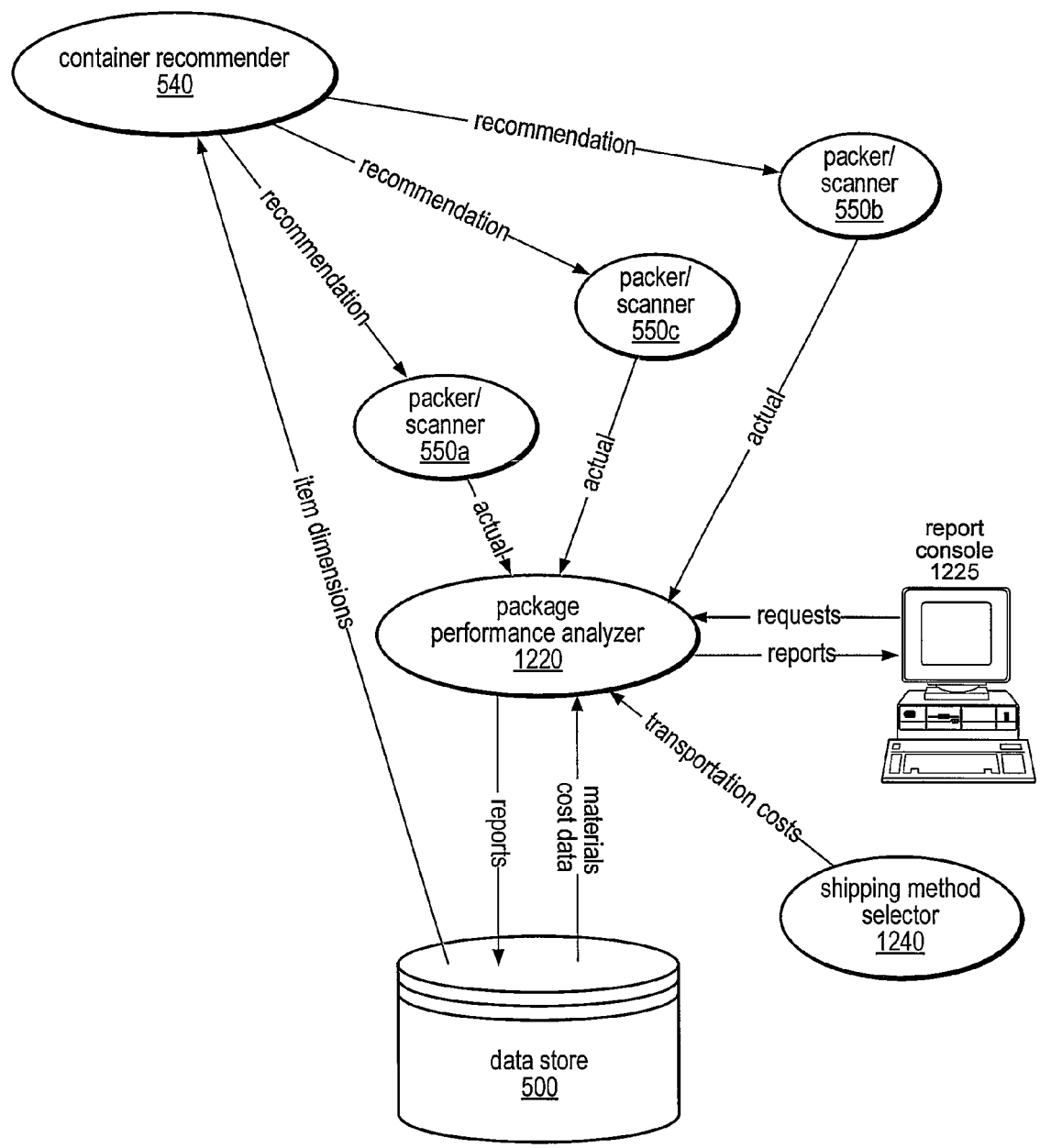
FIG. 9 illustrates a data flow diagram for a system implementing package performance analysis, according to one embodiment.

A data flow diagram for a package performance analysis system, as described herein, is illustrated in FIG. 9 according to one embodiment. The package performance analysis system may include various hardware and/or software components configured to carry out the operations described herein as part of package performance analysis. In this example, data store 500 may be a data store containing item parameter values for all of the items handled within a materials handling facility. A container recommender 540 may access data store 500 to obtain currently stored item dimension values for items in an item package and may use this information to recommend a container in which the item package may be handled, as described above. In various embodiments, data store 500 and/or container recommender 540 may be the same components illustrated in FIG. 8 for use in product dimension corrector, or they may be similar, but separate components.

As illustrated in FIG. 9, container recommender 540 may provide recommendations of containers suitable for handling item packages to various packer/scanner operations 550. For example, each of the recommendations provided to packer/scanner operations 550a, 550b, and 550c may include a packing list and a recommended container for the items on the packing list. The packer/scanner operations 550 may then provide information regarding actual containers used to handle the item packages to dimension correction manager 520. Packer/scanner operations 550a, 550b, and 550c may in various embodiments be the same operations illustrated in FIG. 8 for use in product dimension corrector, or they may be similar, but separate operations.

In this example, package performance analyzer 1220 may be configured to determine if the shipping cost associated with an actual container and a recommended container are the same and/or to report any differences between actual and recommended containers and/or shipping costs for item packages. This is illustrated as reports provided by package performance analyzer 1220 to data store 500. In addition, package performance analyzer 1220 may be configured to provide other packaging-related information to data store 500, such as feedback received from one of packer/scanner operations 550 regarding the use of a container other than a recommended container. Package performance analyzer 1220 may also be configured to obtain packaging-related information from data store 550, such as shipping materials costs, item and shipping material dimensions and/or weights, etc.

In the example illustrated in FIG. 9, package performance analyzer 1220 may be configured to receive transportation cost information from shipping method selector 1240. For example, shipping method selector 1240 may be configured to determine expected transportation costs for an item package packed and shipped in a recommended container and/or actual transportation costs for an item package packed in an actual container, as described above.

Package performance analyzer 1220 may in some embodiments be configured to receive request for reports via report console 1225 and to provide the requested reports on console 1125. For example, report console 1225 may include a web browser through which a user may request various package performance reports and on which these reports may be displayed. Various exemplary package performance reports are described below.

Figure 10:
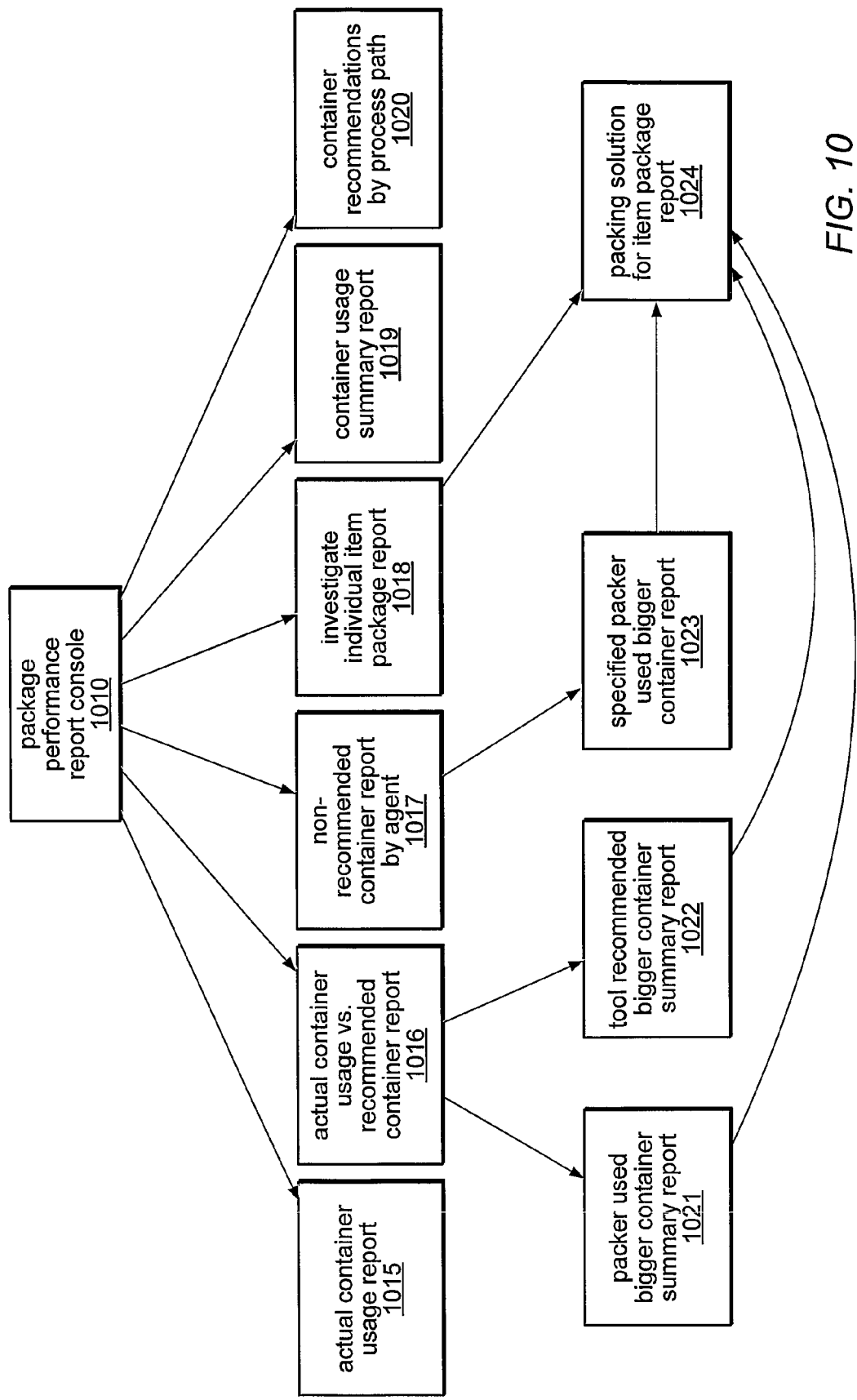
FIG. 10 illustrates a series of package performance reports, according to one embodiment.

FIG. 10 illustrates a series of package performance reports that may be generated via package performance report console 1010. As previously described, such a report console may provide a web browser interface or other suitable user interface for users requesting package performance reports and entering report parameters. In this example, six primary package performance reports (1015-1020) are illustrated, as well as four derivative reports (1021-1024). As used herein, the terms "primary report" may refer to a standard package performance report or an initial report requested by a user, in different embodiments. The term "derivative report" may refer to a report generated from data included in a primary report, e.g., by further sorting the report data or drilling down on a report entry. The package performance reports illustrated in FIG. 10 are merely exemplary and are not meant to be limiting on the types or number of reports that may be generated by the package performance analyzer.

In the example illustrated in FIG. 10, an actual container usage report 1015 may be generated. This report may include a table or graph depicting the number and/or percentage of containers (e.g., boxes) used to ship item packages, in some embodiments. The report may in some embodiments include identifiers of each item package along with the actual container used. In some embodiments, the report may also include other relevant packaging-related information, such as an identifier of an agent or packing station responsible for packing the item package. The entries in the report may be sorted and/or displayed by date, agent, container type, or any other suitable parameter specified in the report request or included as a default parameter value. In some embodiments, the entries may represent aggregated data, such as a total or average number of containers per day or per location, for example.

An actual container vs. recommended container report 1016 is also illustrated in FIG. 10. This report may in some embodiments include a table or graph depicting a comparison between the number or percentage of each actual containers type used and the number or percentage of recommended container types used. For example, each entry in this report may include an identifier of a container type, the number of times the container was recommended, and the number of times the container was used. In various embodiments, each entry in this report may also include item package identifiers, dates, or other relevant packaging-related information, and may be sorted and/or displayed by date, agent, container type, or any other suitable parameter specified in the report request or included as a default parameter value. In some embodiments, the entries may represent aggregated data, such as a total or average number of containers used vs. recommended per day or per location, for example.

FIG. 10 also illustrates a non-recommended container report by agent 1017. This report may in some embodiments include a table or graph illustrating the number or percentage of item packages for which a recommended container was not used, sorted by individual agents. For example, each entry in the report may include an identifier of an agent, a number of larger than recommended containers used, a percentage of larger than recommended containers used, a number of smaller than recommended containers used, a percentage of smaller than recommended containers used, a cumulative excess cost associated with larger than recommended containers, a cumulative cost associated with smaller than recommended containers, or any other relevant packaging-related information. In some embodiments, the data in this report may be sorted and/or displayed by date, by site, by agent, or by any other suitable parameter specified in the report request or included as a default parameter value. For example, in one embodiment, the data in this report may be sorted by an identifier of the manager of each agent, and the report may be provided to the manager in order for him or her to determine if an agent requires additional training.

An "investigate individual item package" report 1018 is illustrated in FIG. 10. This report may in some embodiments include all stored information related to the packaging and shipping of a given item package. For example, it may include a date, a time, an identifier of a packing station, an identifier of the responsible packing agent, an identifier of a recommended container, an identifier of the actual container, expected shipping costs, actual shipping costs, a list of the items included in the item package, a list of any non-item contents included in the container, or any other relevant information.

As illustrated in FIG. 10, the package performance analyzer may in some embodiments be configured to generate an avoidable shipping cost summary report 1019. Each entry in this report may in some embodiments include a date, an avoidable transportation cost (i.e., the excess cost resulting from use of a non-recommended container), an avoidable consumables cost (i.e., the excess cost of shipping materials), a total avoidable shipping cost, a count of avoidable container selections, a percentage of avoidable container selections, and a percentage of shipping costs that are avoidable.

The last primary package performance report illustrated in FIG. 10 is a container recommendations by process path report 1020. This report may include a recommended suite of containers for one or more process paths in the materials handling facility. For example, if a high-speed automated packing machine may only handle one container type at a time, the package performance analyzer may recommend that the machine be used with the most common container type and that item packages for which the most common container type is recommended be directed to that packing line. Similarly, if a particular packing station is located in a smaller than average area in the facility, the package performance analyzer may recommend that only the smallest container types be used at the packing station and that item packages for which these container types are recommended be directed to that packing line.

As noted above, FIG. 10 illustrates several derivative package performance reports. The first, at 1021, may be derived from data included in primary report 1016 (actual container usage vs. recommended container usage report). Report 1021 includes only those entries for which an item package was packed in a bigger than recommended container, in this example. The report entries may include the same information as those described above regarding report 1016, in some embodiments, or any subset or transformation of that information, according to received report parameters. For example, the information in report 1021 may be sorted using a different parameter, a different parameter value, or a different parameter value range than that used in generating report 1016. In this example, report 1022 is similar to report 1021, but includes only those entries of report 1016 for which an item package was packed in a smaller than recommended container (i.e., the tool recommended a bigger container than may have been necessary to handle the items.)

Derivative report 1023 ("specified packer used bigger container"), in the example illustrated in FIG. 10, may be derived from information included in primary report 1017 ("non-recommended container report by agent"). This information in each entry of derivative report 1023 may be the same as that in the entries of report 1017, or may be a subset or a transformation of the information in report 1017, in various embodiments.

As illustrated in FIG. 10, a packing solution for item package report 1024 may be derived from any of reports 1021, 1022, 1023, and 1017, in this example. This report may be generated by drilling down on an entry included in one of these reports to identify a particular item package. The report may in some embodiments display a recommended packing algorithm and/or placement for packing the items included in the item package in a container of the recommended container type. Such a report may in some embodiments be used for training purposes, such as to illustrate to an agent the preferred method for packing containers such that the most cost-effective containers may be used as recommended.

As noted above, the package performance analyzer may be configured to generate other types of reports not illustrated in FIG. 10. In one embodiment, it may be configured to generate a graph or chart illustrating the number or percentage of container mismatches due to each of a number of different reasons for the mismatch. For example, the package performance analyzer may be configured to generate a pie chart illustrating the percentage of container mismatches or the excess shipping costs due to agent error (e.g., as determined by the analyzer), the recommended container not being available (e.g., as determined from feedback received), or item dimensions in the data store being incorrect for one or more items in the item packages.

Figure 11:
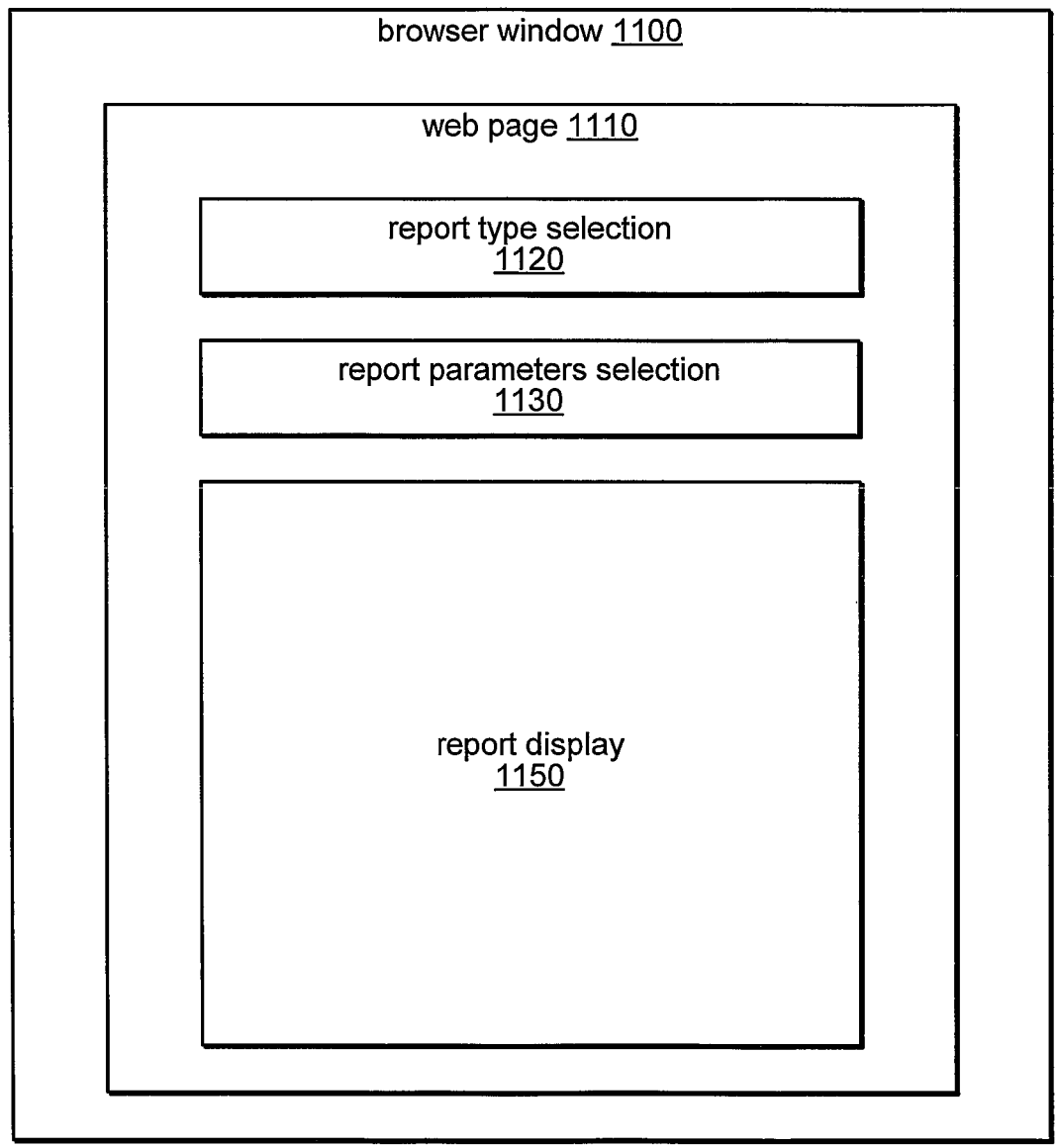
FIG. 11 illustrates a user interface suitable for interacting with a package performance analyzer, according to one embodiment.

As previously noted, users may interact with the package performance analyzer through any suitable user interface, including a web browser interface. FIG. 11 illustrates a browser window 1100, which may be displayed on an input/output device configured to communicate with the package performance analyzer, such as on report console 1240, illustrated in FIG. 9. In this example, browser window 1100 is shown displaying a web page 1110, which may be configured as an interface for requesting and/or receiving package performance reports, in some embodiments. In this example, web page 1110 includes three input/output fields: report type selection 1120, report parameters selection 1130, and report display 1150, although any number and type of input/output fields may be displayed in such an interface.

Report type selection field 1120 may in some embodiments be used to specify the report or reports that are to be generated. For example, a user may specify one or more reports to be generated by selecting one or more items on a pull-down menu or radio buttons, in different embodiments. In one embodiment, each of a set of standard package performance reports (e.g., those illustrated in FIG. 10) may be selectable by a pull-down menu or other means, or a user may specify that a custom report should be generated. If a custom report is generated, the user may be prompted to enter the parameters of the custom report (e.g., the data fields and corresponding value ranges to extract from the data store) in report parameters selection field 1130 or in another custom parameters selection field (not shown), in different embodiments.

As described above, depending on the package performance report(s) selected, the user may be prompted to enter values or value range for the configurable parameters of the report(s). For example, if report 1015 ("actual container usage report") is selected, the user may be prompted to input a date or date range, or a facility, site, or packing station for which the report should be generated. In another example, if report 1023 ("specified packer used bigger container") is selected, the user may in some embodiments be prompted to input an identifier of the agent. In other embodiments, this report may be generated by selecting an agent from the display of one of reports 1021, 1022, or 1017 (e.g., using a mouse). Report parameters selection field 1130 may in some embodiments also be used to specify a report format from a menu, radio buttons, or by other input means. For example, the user may specify that a report should be presented in a tabular format, sorted by date, or as a histogram, with agent identifiers on the primary axis. In another example, the user may specify that a report should be presented to the user by displaying it on the report console and/or that it should be printed, emailed to one or more other users (e.g., managers), or stored in the data store.

As illustrated in FIG. 11, the requested report(s) may be presented to the user on web page 1110 in report display field 1150. For example, if the user has specified that reports should be displayed, or if this is a default condition for various reports, a tabular or graphical report may be displayed in this window, in some embodiments.

Another field that may be included in web page 1110 is a schedule selection field (not shown). A schedule selection field may be used to specify a schedule on which a regular set of package performance reports is to be generated. For example, a user may select an option from a pull-down menu or a series of radio buttons to specify that the requested reports should be generated daily, weekly, or after each shift, in some embodiments. In another embodiment a user may enter a day of the week and/or a specific time at which the reports should be generated, such as by typing this information in an input field of web page 1110.

In some embodiments, the product dimension correction manager and/or package performance analyzer described herein may be components of a comprehensive packaging information service. Such a service may include additional components configured to provide other functionality to various operations in the materials handling facility. For example, the service may include any or all of the following:

- a box forecasting service, configured to generate a report specifying what containers (e.g., boxes) to erect, and when to erect them, so that they are delivered to shipment assembly at the same time as the items.
- a package type recommender, configured to recommend a packaging type based on shipment weight or product types to reduce damage in shipping. For example, stronger corrugate may be recommended for heavier product or a fragile item may be directed to a box rather than a folder.
- a shipping method recommender, configured to assign shipment methods dependent on box type availability and the resulting cost of shipment.
- a filler recommender, configured to recommend a number of air bags for a container, for example.
- an inbound prepping service, configured to use a container recommendation for prepping of inbound items.
- a packaging system flow analyzer, configured to display a tradeoff in packaging choice versus productivity in real time. For example, if a package choice is optimum, but a corresponding productivity impact negates savings, the analyzer may recommend a choice to be made.
- an automated inventory cycle counter, configured to decrement consumables used in packing/shipping operations. This may reduce manual cycle count errors, and account for wastage.
- a financial analyzer, configured to offer comparison data for supplies cost from container usage reports to manual cycle count usage data.

a new merchant shipping cost forecaster, configured to determine a real shipping cost impact of new merchant integration to replace fixed estimates.

a customer container advisor, configured to determine the number of boxes a customer should expect for an order and to display this at checkout.

a process path recommender, configured to direct particular item packages to process paths in which recommended containers are available.

Figure 12:
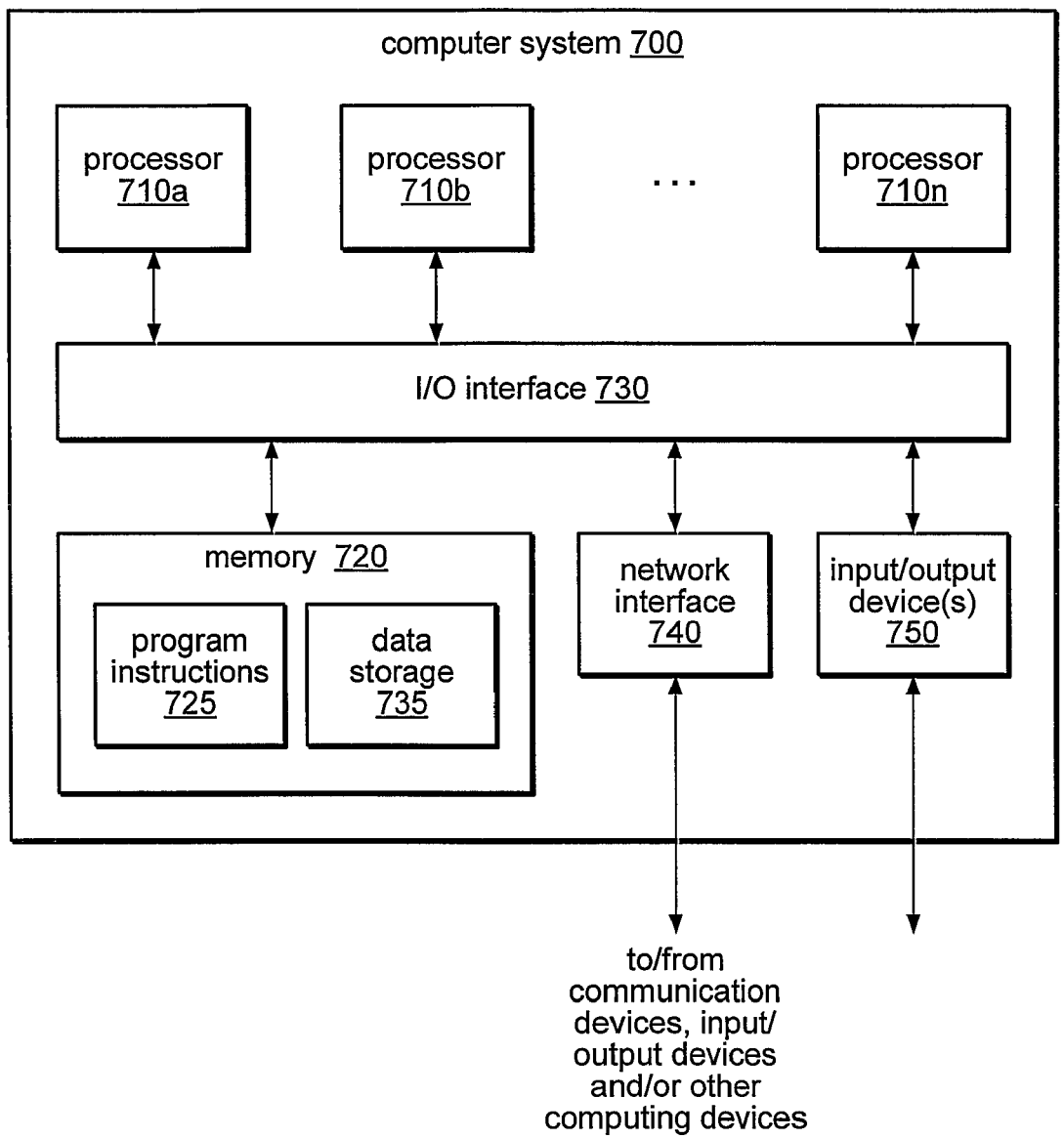
FIG. 12 is a block diagram illustrating an exemplary embodiment of a computer system suitable for implementing product dimension correction.

Automated product dimension correction and/or package performance analysis, as described herein, may be executed on one or more computer systems, interacting with various other devices in a materials handling facility, according to various embodiments. One such computer system is illustrated by FIG. 12. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750. In some embodiments, it is contemplated that automated product dimension correction and/or package performance analysis may be implemented using a single instance of computer system 700, while in other embodiments multiple such systems, or multiple nodes making up computer system 700, may be configured to host different portions or instances of automated product dimension correction and/or package performance analysis. For example, in one embodiment some data sources or services (e.g., capturing actual container information) may be implemented via one or more nodes of computer system 700 that are distinct from those nodes implementing other data sources or services (e.g., recommending a container for an item package). In some embodiments, a given node may implement the functionality of more than one component of automated product dimension correction and/or package performance analysis.

In various embodiments computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. For example, in one embodiment a measurement mechanism, such as measurement mechanism 560 described above, may be configured to communicate with computer system 700 via network interface 740. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 12, memory 720 may include program instructions 725, configured to implement automated product dimension correction and/or package performance analysis, and data storage 735, comprising various tables, databases and/or other data structures accessible by program instructions 725. In one embodiment, program instructions 725 may include various software modules configured to implement a product dimension correction system, as described in FIGS. 3-5 and 8 and/or package performance analysis, as described in FIGS. 6, 7, and 9. Data storage 735 may include various data stores for maintaining item parameter values (such as those illustrated as being stored in Table 1), container parameter values (such as those illustrated as being stored in Table 2), item package information (such as that illustrated as being stored in Table 3), shipping reports (not shown), actual or expected shipping costs, avoidable shipping costs, package performance reports (e.g., reports 1015-1024), etc.

One module included in program instruction 725 for a product dimension correction system may be an information gathering module configured to capture the contents of item packages handled within an actual container. As described earlier, capturing the contents of a container may include capturing identifiers of both the container and its contents, and may be performed when items are placed in the container or at any other time. In some embodiments, these identifiers may be captured automatically by sensors or scanners. In other embodiments, an agent working in the facility may cause them to be captured by using a scanner or other means, in various embodiments. An information gathering module may, in some embodiments, include program instructions configured to control such automated capturing and/or may include program instructions configured to receive this information as inputs and store it in memory 720 (e.g., in data storage 735). An information gathering module may also include instructions configured to retrieve the dimensions of actual containers, portals, and paths used to handle an item package, such as by accessing their values in memory according to a captured identifier, in some embodiments. Information gathered by an information gathering module may in some embodiments be received via one or more of input/output devices 750, or from devices configured to communicate with computer system 700 via network interface 740, in different embodiments.

Another software module included in a product dimension correction system and included in program instructions 725 may be a container recommender module, such as container recommender 540 described above. In some embodiments, this module may include program instructions configured to implement recommending a container for an item package, such as described above regarding operation 300 of FIG. 3. In some embodiments, a container recommender may include program instructions configured to identify items to be grouped for one of the operations of the materials handling facility by receiving or generating a stow list, pick list, inventory list, order, packing list, etc., which may be a physical list, such as a printed list, or may be a virtual list, such as may be contained in memory, displayed on a monitor or other input/output device, or scanned automatically or by an agent in the materials handling facility to serve as an input to the automated product dimension correction system. A container recommender may also include program instructions configured to retrieve currently stored item dimensions of any of the items in the item package, in some embodiments. As described above, these dimensions may be retrieved from a table, database, or other data structure, such as Table 1 illustrated above. Finally, a container recommender may be configured to determine a recommended container, portal, or path for handling the group of items, as described in detail above.

Another software module making up a product dimension correction system and included in program instructions 725 may be a feedback handler. In some embodiments, this module may include program instructions configured to implement receiving feedback from various operations of a materials handling facility to be used by the product dimension correction system. This feedback may include an indication of whether or not a recommended container, portal, or path was used, a reason that a recommended container, portal, or path was not used, an indication that one or more items was not completely located within a container, information gathered during an item measurement, or any other feedback received from the various operations of the facility. This feedback may be received via one or more of input/output devices 750, or from devices configured to communicate with computer system 700 via network interface 740, in different embodiments.

In some embodiments, the feedback handler may receive feedback related to packages and item contents of packages from other sources, such as based on item/package returns and/or customer support interactions (e.g., an indication of package suitability or item damage). In some embodiments, the feedback handler may include program instructions configured to control one or more input/output devices used to provide automated feedback, such as sensors or scanners, or may include program instructions configured to receive feedback entered manually by an agent in the facility, such as by entering it at a terminal or by pressing one or more buttons, levers, switches, etc.

An automated product dimension correction system may also include a dimension correction manager, such as dimension correction manager 520 illustrated in FIG. 8, as part of program instructions 725. The dimension correction manager may include program instructions configured to implement determining which items have inaccurate item dimension values, as described above. It may also be configured to update one or more tables, databases, or other data stores of parameters associated with items and containers in a materials handling facility in response to receiving measured item dimension values and/or other inputs. For example, the dimension correction manager may be configured to update one or more item dimension values, ranges, or confidence levels in response to determining a packaging incongruity and/or measuring an item included in an item package for which a packaging incongruity was detected.

Program instructions 725 may also include one or more software modules configured to implement package performance analysis, as described herein. For example, program instructions 725 may include package performance analyzer 1220 and/or shipping method selector 1240, illustrated in FIG. 9. It may also include program instructions suitable for interacting with data store 500 (e.g., to store and/or retrieve data from the data store) and/or report console 1225. In various embodiments, program instructions 725 may include software modules configured to implement any of the functionality described herein for comprehensive packaging information system.

As noted above, data storage 735 may include one or more tables, databases, or other data structures used for storing and retrieving various parameter values used in conjunction with the system and methods described herein. For example, a system for automated product dimension correction may include an item parameters data store, such as that illustrated in Table 1. An item parameters data store may include any data related to the items in the materials handling facility, such as an identifier, a weight, a volume, a length, a height, a width, a suspect dimensions count, or a confidence level value. It may also include item names, quantities, descriptions, pricing, cost, or any other information that may be included in a product catalog, inventory management system, or other representation of the items in the materials handling facility, in various embodiments.

Similarly, data storage 735 may include a container parameters data store, such as that illustrated in Table 2, which may include container identifiers, names, and dimensions. In various embodiments, a container parameters data store may also include such information as weight, color, composition, quantity, supplier name, or any other information about containers that may be useful to the various operations of the materials handling facility. In various embodiments, a container parameters data store may include any data related to the containers, portals, or paths used for storing, conveying, or shipping the items of the materials handling facility, as described herein. A product dimension correction system may, in some embodiments, retrieve this or any other information from the item parameters data store and/or container parameters data store necessary to perform the various functions described herein.

In some embodiments, data storage 735 may include a package parameters data store, such as that illustrated in Table 3. A package parameters data store may, in some embodiments, include information about actual containers and their contents (e.g., item packages handled within the actual containers), as well as recommended containers. For example, each entry in a package parameters data store may include the item package contents, as well as the recommended and actual container identifiers and their dimensions. In various embodiments, any or all of the tables described herein may be included in a single data store, such as data store 500 illustrated in FIG. 8.

In addition, data storage 735 may include any of the tables, databases, and other data structures described above as being used by or produced by a package performance analyzer. For example, data storage 735 may include one or more such data structures for storing actual and/or expected shipping costs, shipping materials costs, or package performance reports generated by the analyzer.

In various embodiments, the parameter values and other data illustrated herein as being included in one or more data stores may be combined with other information not described or may be partitioned differently into more, fewer, or different data structures. In some embodiments, data stores used in automated product dimension correction and/or package performance analysis, or portions thereof, may be physically located in one memory or may be distributed among two or more memories. These memories may be part of a single computer system or they may be distributed among two or more computer systems, such as two computer systems connected by a wired or wireless local area network, or through the Internet, in different embodiments. Similarly, in other embodiments, different software modules and data stores may make up an automated product dimension correction system and/or a package performance analyzer.

Users may interact with the product dimension correction system and/or package performance analyzer in various ways in different embodiments, such as to automatically measure and/or manually specify measured dimension values for items and/or packaging, to specify thresholds to be used when determining suspect item dimensions, or to specify package performance reports to be generated and/or report parameters. For example, some users may have physical access to computing system 700, and if so may interact with various input/output devices 750 (e.g., report console 1225) to provide and/or receive information. Alternatively, other users may use client computing systems to access the product dimension correction system and/or package performance analyzer, such as remotely via network interface 740 (e.g., via the Internet and/or the World Wide Web). In addition, some or all of the product dimension correction system and/or package performance analyzer components may provide various feedback or other general types of information to users (e.g., in response to user requests) via one or more input/output devices 750.

Those skilled in the art will appreciate that computing system 700 is merely illustrative and is not intended to limit the scope of the present invention. In particular, the computing system and devices may include any combination of hardware or software that can perform the indicated functions, including computers, network devices, internet appliances, PDAs, wireless phones, pagers, etc. Computing system 700 may also be connected to other devices that are not illustrated, or instead may operate as a stand-alone system. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as illustrated in the figures and described herein represent exemplary embodiments of methods. The methods may be implemented in software, in hardware, or in a combination thereof in other embodiments. Similarly, the order of any method may be changed, and various elements may be added, reordered, combined, omitted, modified, etc., in other embodiments.

From the foregoing it will be appreciated that, although specific embodiments have been described herein for purposes of illustration, various modifications may be made without deviating from the spirit and scope of the invention.

Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer accessible storage medium, other aspects may likewise be so embodied.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computing system, comprising one or more computing nodes that during operation implement:
   a memory that stores packaging-related information in a materials handling facility; and
   a package performance analyzer that during operation:
      receives an indication of a recommended container in which to pack a group of items in the materials handling facility to be shipped, wherein the group of items comprises one or more items to be packed together for shipping, and wherein the indication identifies a container of a specific type and size;
      calculates an expected cost of shipping the group of items in the recommended container, wherein the expected shipping cost comprises an expected transportation cost and an expected shipping materials cost, and wherein the expected shipping cost is dependent on the recommended container;
      receives an indication of an actual container in which the group of items was packed and shipped, wherein the indication of the actual container identifies a container of a specific type and size that is different than the recommended container;
      calculates an actual cost of shipping the group of items in the actual container, wherein the actual shipping cost comprises an actual transportation cost and an actual shipping materials cost, and wherein the actual shipping cost is dependent on the actual container;
      stores the expected shipping cost and the actual shipping cost as part of the packaging-related information in the memory, wherein the expected shipping cost and the actual shipping cost are associated with an identifier of the group of items; and
      analyzes performance of packaging-related operations in the materials handling facility dependent on the packaging-related information stored in the memory, wherein analyzing performance of packaging-related operations comprises:
         comparing the expected shipping cost to the actual shipping cost; and
         in response to determining that the actual shipping cost exceeds the expected shipping cost, determining an excess shipping cost value for the group of items that is due to shipping the group of items in a container other than the recommended container.

2. The system of claim 1, wherein the expected shipping materials cost comprises a cost of the recommended container and the actual shipping materials cost comprises a cost of the actual container, and wherein the cost of the recommended container and the cost of the actual container are stored in the memory.

3. The system of claim 1, wherein the expected shipping materials cost comprises a cost of non-item contents expected to be included in the recommended container and the actual shipping materials cost comprises a cost of non-item contents included in the actual container, and wherein the cost of non-item contents expected to be included in the recommended container and the costs of non-item contents included in the actual container are stored in the memory.

4. The system of claim 1, wherein the recommended container is dependent on item dimension values of the one or more items stored in the memory.

5. The system of claim 1, wherein during operation the one or more computing nodes further implement a transportation method selector, wherein the expected transportation cost and the actual transportation cost are determined by the transportation method selector dependent on the recommended and actual containers, respectively, and are received from the transportation method selector.

6. The system of claim 1, wherein during operation the package performance analyzer:
   receives an indication of an ideal container for the group of items, wherein the ideal container is a container having interior dimensions equal to those of a three-dimensional bounding box of sufficient length, width, and height to contain the one or more items;
   calculates an ideal cost of shipping the group of items in the ideal container, wherein the ideal shipping cost comprises an ideal transportation cost and an ideal shipping materials cost, and wherein the ideal shipping cost is dependent on the ideal container;
   stores the ideal shipping cost in the memory, wherein the ideal shipping cost is associated with the identifier of the group of items;
   compares the ideal shipping cost to the actual shipping cost; and
   in response to determining that the actual shipping cost exceeds the ideal shipping cost, determines a second excess shipping cost value for the group of items that is due to shipping the group of items in a container other than the ideal container.

7. The system of claim 1, wherein during operation the package performance analyzer calculates a second expected shipping cost, a second actual shipping cost, and a second excess shipping cost value for a second group of items and storing them in the memory, wherein the second expected shipping cost, the second actual shipping cost, and the second excess shipping cost value are associated with an identifier of the second group of items.

8. The system of claim 1, wherein during operation the package performance analyzer provides a recommended corrective action for the excess shipping cost value.

9. The system of claim 8, wherein during operation the package performance analyzer receives feedback indicating one or more reasons that the recommended container was not used, and wherein the recommended corrective action is dependent on the one or more reasons.

10. The system of claim 8, wherein the recommended corrective action comprises one or more of: adding one or more additional container types in the materials handling facility, removing one or more container types from the materials handling facility, providing training for one or more agents in the materials handling facility, or directing given groups of items to particular process lines in the materials handling facility.

11. The system of claim 1, wherein during operation the package performance analyzer receives an indication of an identifier of an agent or a packing station in the materials handling facility responsible for packaging the group of items.

12. The system of claim 1, wherein during operation the one or more computing nodes further implement an item dimension correction system, wherein during operation the item dimension correction system determines that stored item dimension values for one of the one or more items are incorrect;
   wherein during operation the package performance analyzer calculates a portion of the excess cost value resulting from the incorrect item dimension values.

13. The system of claim 1, wherein during operation the one or more computing nodes further implement a user interface;
   wherein during operation the user interface:
      receives a request for one or more package performance reports; and
      communicates the request to the package performance analyzer; and
   wherein during operation the package performance analyzer generates the one or more reports dependent on the packaging-related information stored in the memory and returns them to the user interface.

14. The system of claim 13, wherein the one or more reports comprise information indicating one or more of: a summary of actual container usage, actual containers used for one or more groups of items, containers recommended for one or more groups of items, ideal containers for one or more groups of items, expected shipping costs for one or more groups of items, actual shipping costs for one or more groups of items, ideal shipping costs for one or more groups of items, container recommendations for the materials handling facility, excess shipping costs for one or more groups of items, and reasons that a recommended container was not used for one or more groups of items.

15. The system of claim 13, wherein information presented in the one or more reports is determined by one or more report parameters specified for the reports; and wherein the one or more report parameters comprise one or more of: a time, a date, a time range, a date range, a location, a site, a facility, a process line, a packing station, an identifier of an agent, an identifier of an group of items, a cost range, and an excess cost threshold.

16. A computer-implemented method, comprising:
   performing by one or more computers:
      receiving an indication of a recommended container in which to pack a group of items in a materials handling facility to be shipped, wherein the group of items comprises one or more items to be packed together for shipping, and wherein the indication identifies a container of a specific type and size;
      calculating an expected cost of shipping the group of items in the recommended container, wherein the expected shipping cost comprises an expected transportation cost and an expected shipping materials cost, and wherein the expected shipping cost is dependent on the recommended container;
      receiving an indication of an actual container in which the group of items was packed and shipped, wherein the indication of the actual container identifies a container of a specific type and size that is different than the recommended container;
      calculating an actual cost of shipping the group of items in the actual container, wherein the actual shipping cost comprises an actual transportation cost and an actual shipping materials cost, and wherein the actual shipping cost is dependent on the actual container;
      storing the expected shipping cost and the actual shipping cost in a memory as part of packaging-related information stored in the memory, wherein the expected shipping cost and the actual shipping cost are associated with an identifier of the group of items; and
      analyzing performance of packaging-related operations in the materials handling facility dependent on the packaging-related information stored in the memory, wherein analyzing performance of packaging-related operations comprises:
         comparing the expected shipping cost to the actual shipping cost; and
         in response to determining that the actual shipping cost exceeds the expected shipping cost, determining an excess shipping cost value for the group of items that is due to shipping the group of items in a container other than the recommended container.

17. The method of claim 16, wherein the expected shipping materials cost comprises a cost of the recommended container and the actual shipping materials cost comprises a cost of the actual container, and wherein the cost of the recommended container and the cost of the actual container are stored in the memory.

18. The method of claim 16, wherein the expected shipping materials cost comprises a cost of non-item contents expected to be included in the recommended container and the actual shipping materials cost comprises a cost of non-item contents included in the actual container, and wherein the cost of non-item contents expected to be included in the recommended container and the costs of non-item contents included in the actual container are stored in the memory.

19. The method of claim 16, wherein the recommended container is dependent on item dimension values of the one or more items stored in the memory.

20. The method of claim 16, wherein the expected transportation cost and the actual transportation cost are determined by a transportation method selector dependent on the recommended and actual containers, respectively, and are received from the transportation method selector.

21. The method of claim 16, further comprising:
   receiving an indication of an ideal container for the group of items, wherein the ideal container is a container having interior dimensions equal to those of a three-dimensional bounding box of sufficient length, width, and height to contain the one or more items;
   calculating an ideal cost of shipping the group of items in the ideal container, wherein the ideal shipping cost comprises an ideal transportation cost and an ideal shipping materials cost;
   storing the ideal shipping cost in the memory, wherein the ideal shipping cost is associated with the identifier of the group of items;
   comparing the ideal shipping cost to the actual shipping cost; and
   in response to determining that the actual shipping cost exceeds the ideal shipping cost, determining a second excess shipping cost value for the group of items that is due to shipping the group of items in a container other than the ideal container.

22. The method of claim 16, further comprising:
   calculating a second expected shipping cost, a second actual shipping cost, and a second excess shipping cost value for a second group of items; and
   storing the second expected shipping cost, the second actual shipping cost, and the second excess shipping cost value in the memory, wherein the second expected shipping cost, the second actual shipping cost, and the second excess shipping cost value are associated with an identifier of the second group of items.

23. The method of claim 16, further comprising providing a recommended corrective action for the excess shipping cost value.

24. The method of claim 23, further comprising receiving feedback indicating one or more reasons that the recommended container was not used; wherein the recommended corrective action is dependent on the one or more reasons.

25. The method of claim 23, wherein the recommended corrective action comprises one or more of: adding one or more additional container types in the materials handling facility, removing one or more container types from the materials handling facility, providing training for one or more agents in the materials handling facility, or directing given groups of items to particular process lines in the materials handling facility.

26. The method of claim 16, further comprising receiving an indication of an identifier of an agent or a packing station in the materials handling facility responsible for packaging the group of items.

27. The method of claim 16, further comprising calculating a portion of the excess cost value resulting from storing incorrect item dimension values for the one or more items.

28. The method of claim 16, further comprising:
receiving a request for one or more package performance reports on behalf of a user;
generating the one or more reports dependent on the packaging-related information stored in the memory; and
providing the one or more reports to the user.

29. The method of claim 28, wherein the one or more reports comprise information indicating one or more of: a summary of actual container usage, actual containers used for one or more groups of items, containers recommended for one or more groups of items, ideal containers for one or more groups of items, expected shipping costs for one or more groups of items, actual shipping costs for one or more groups of items, ideal shipping costs for one or more groups of items, container recommendations for the materials handling facility, excess shipping costs for one or more groups of items, and reasons that a recommended container was not used for one or more group of items.

30. The method of claim 28, wherein information presented in the one or more reports is determined by one or more report parameters specified for the reports; and wherein the one or more report parameters comprise one or more of: a time, a date, a time range, a date range, a location, a site, a facility, a process line, a packing station, an identifier of an agent, an identifier of an group of items, a cost range, and an excess cost threshold.

31. A non-transitory computer-readable storage medium storing program instructions that when executed on one or more computers cause the one or more computers to perform:
receiving an indication of a recommended container in which to pack a group of items in a materials handling facility to be shipped, wherein the group of items comprises one or more items to be packed together for shipping, and wherein the indication identifies a container of a specific type and size;
calculating an expected cost of shipping the group of items in the recommended container, wherein the expected shipping cost comprises an expected transportation cost and an expected shipping materials cost, and wherein the expected shipping cost is dependent on the recommended container;
receiving an indication of an actual container in which the group of items was packed and shipped, wherein the indication of the actual container identifies a container of a specific type and size that is different than the recommended container;
calculating an actual cost of shipping the group of items in the actual container, wherein the actual shipping cost comprises an actual transportation cost and an actual shipping materials cost, and wherein the actual shipping cost is dependent on the actual container;
storing the expected shipping cost and the actual shipping cost in a memory as part of packaging-related information stored in the memory; and
analyzing performance of packaging-related operations in the materials handling facility dependent on the packaging-related information stored in the memory, wherein analyzing performance of packaging-related operations comprises:
comparing the expected shipping cost to the actual shipping cost; and
in response to determining that the actual shipping cost exceeds the expected shipping cost, providing an indication that the actual shipping cost exceeded the expected shipping cost for the group of items due to shipping the group of items in a container other than the recommended container.

32. The non-transitory computer-readable storage medium of claim 31, wherein the expected shipping materials cost comprises a cost of the recommended container and the actual shipping materials cost comprises a cost of the actual container, and wherein the cost of the recommended container and the cost of the actual container are stored in the memory.

33. The non-transitory computer-readable storage medium of claim 31, wherein the expected shipping materials cost comprises a cost of non-item contents expected to be included in the recommended container and the actual shipping materials cost comprises a cost of non-item contents included in the actual container, and wherein the cost of non-item contents expected to be included in the recommended container and the costs of non-item contents included in the actual container are stored in the memory.

34. The non-transitory computer-readable storage medium of claim 31, wherein the recommended container is dependent on item dimension values of the one or more items stored in the memory.

35. The non-transitory computer-readable storage medium of claim 31, wherein the expected transportation cost and the actual transportation cost are determined by a transportation method selector dependent on the recommended and actual containers, respectively, and are received from the transportation method selector.

36. The non-transitory computer-readable storage medium of claim 31, wherein the program instructions are further executable to implement:
receiving an indication of an ideal container for the group of items, wherein the ideal container is a container having interior dimensions equal to those of a three-dimensional bounding box of sufficient length, width, and height to contain the one or more items;
calculating an ideal cost of shipping the group of items in the ideal container, wherein the ideal shipping cost comprises an ideal transportation cost and an ideal shipping materials cost;
storing the ideal shipping cost in the memory, wherein the ideal shipping cost is associated with an identifier of the group of items;
comparing the ideal shipping cost to the actual shipping cost; and in response to determining that the actual shipping cost exceeds the ideal shipping cost, determining an excess shipping cost value for the group of items that is due to shipping the group of items in a container other than the ideal container.

37. The non-transitory computer-readable storage medium of claim 31, wherein the program instructions are further executable to implement calculating and storing a second expected shipping cost, a second actual shipping cost, and an excess shipping cost value for a second group of items, wherein the second expected shipping cost, the second actual shipping cost, and the excess shipping cost value are associated with an identifier of the second group of items.

38. The non-transitory computer-readable storage medium of claim 31, wherein the program instructions are further executable to implement providing a recommended corrective action in response to said indication that the actual shipping cost exceeded the expected shipping cost for the group of items.

39. The non-transitory computer-readable storage medium of claim 38, wherein the program instructions are further executable to implement receiving feedback indicating one or more reasons that the recommended container was not used; wherein the recommended corrective action is dependent on the one or more reasons.

40. The non-transitory computer-readable storage medium of claim 38, wherein the recommended corrective action comprises one or more of: adding one or more additional container types in the materials handling facility, removing one or more container types from the materials handling facility, providing training for one or more agents in the materials handling facility, or directing given groups of items to particular process lines in the materials handling facility.

41. The non-transitory computer-readable storage medium of claim 31, wherein the program instructions are further executable to implement receiving an indication of an identifier of an agent or a packing station in the materials handling facility responsible for packaging the group of items.

42. The non-transitory computer-readable storage medium of claim 31, wherein the program instructions are further executable to implement calculating an excess cost value resulting from storing incorrect item dimension values for the one or more items.

43. The non-transitory computer-readable storage medium of claim 31, wherein the program instructions are further executable to implement:
   receiving a request for one or more package performance reports on behalf of a user;
   generating the one or more reports dependent on the packaging-related information stored in the memory; and
   providing the one or more reports to the user.

44. The non-transitory computer-readable storage medium of claim 43, wherein the one or more reports comprise information indicating one or more of: a summary of actual container usage, actual containers used for one or more groups of items, containers recommended for one or more groups of items, ideal containers for one or more groups of items, expected shipping costs for one or more groups of items, actual shipping costs for one or more groups of items, ideal shipping costs for one or more groups of items, container recommendations for the materials handling facility, excess shipping costs for one or more groups of items, and reasons that a recommended container was not used for one or more groups of items.

45. The non-transitory computer-readable storage medium of claim 43, wherein information presented in the one or more reports is determined by one or more report parameters specified for the reports; and wherein the one or more report parameters comprise one or more of: a time, a date, a time range, a date range, a location, a site, a facility, a process line, a packing station, an identifier of an agent, an identifier of an group of items, a cost range, and an excess cost threshold.

* * * * *